US010787255B2

(12) United States Patent
George

(10) Patent No.: US 10,787,255 B2
(45) Date of Patent: Sep. 29, 2020

(54) AERIAL VEHICLE WITH ENHANCED PITCH CONTROL AND INTERCHANGEABLE COMPONENTS

(71) Applicant: Sky Canoe Inc., Toronto (CA)

(72) Inventor: Dale Arthur George, Tiny (CA)

(73) Assignee: SKY CANOE INC. (CA)

( * ) Notice: Subject to any disclaimer, the term of this patent is extended or adjusted under 35 U.S.C. 154(b) by 0 days.

(21) Appl. No.: 16/686,839

(22) Filed: Nov. 18, 2019

(65) Prior Publication Data
US 2020/0172236 A1 Jun. 4, 2020

Related U.S. Application Data

(60) Provisional application No. 62/773,513, filed on Nov. 30, 2018.

(51) Int. Cl.
*B64C 29/00* (2006.01)
*B64C 39/02* (2006.01)
(Continued)

(52) U.S. Cl.
CPC ............ *B64C 29/0033* (2013.01); *B64C 1/26* (2013.01); *B64C 3/38* (2013.01); *B64C 11/00* (2013.01); *B64C 39/024* (2013.01); *B64D 9/00* (2013.01); *B64D 27/02* (2013.01); *B64C 2201/02* (2013.01); *B64C 2201/04* (2013.01);
(Continued)

(58) Field of Classification Search
CPC ......... B64C 1/26; B64C 3/38; B64C 29/0033; B64D 1/08
See application file for complete search history.

(56) References Cited

U.S. PATENT DOCUMENTS

| 1,814,925 A | 7/1931 | Hicks |
| 3,037,721 A | 6/1962 | Stefanutti |

(Continued)

FOREIGN PATENT DOCUMENTS

| CN | 207712292 U | 8/2018 |
| GB | 575532 | 2/1946 |

(Continued)

OTHER PUBLICATIONS

International Search Report for International Application No. PCT/CA2019/051668 dated Jan. 30, 2020.

*Primary Examiner* — Nicholas McFall
(74) *Attorney, Agent, or Firm* — Tarolli, Sundheim, Covell & Tummino LLP

(57) ABSTRACT

An aircraft capable of vertical take-off and landing comprises a fuselage, at least one processor carried by the fuselage and a pair of aerodynamic, lift-generating wings extending from the fuselage. A plurality of vectoring rotors are rotatably carried by the fuselage so as to be rotatable between a substantially vertical configuration relative to the fuselage for vertical take-off and landing and a substantially horizontal configuration relative to the fuselage for horizontal flight. The vectoring rotors are unsupported by the first pair of wings. The wings may be modular and removably connected to the fuselage and configured to be interchangeable with an alternate pair of wings. A cargo container may be secured to the underside of the fuselage, and the cargo container may be modular and interchangeable with an alternate cargo container.

31 Claims, 29 Drawing Sheets

(51) Int. Cl.
  *B64C 3/38* (2006.01)
  *B64C 1/26* (2006.01)
  *B64D 27/02* (2006.01)
  *B64D 9/00* (2006.01)
  *B64C 11/00* (2006.01)

(52) U.S. Cl.
  CPC .. *B64C 2201/104* (2013.01); *B64C 2201/108* (2013.01); *B64C 2201/141* (2013.01); *B64C 2201/165* (2013.01); *B64D 2027/026* (2013.01)

(56) References Cited

U.S. PATENT DOCUMENTS

| | | |
|---|---|---|
| 3,298,633 A | 1/1967 | Dastoli et al. |
| 3,614,034 A | 10/1971 | Townsend |
| 4,296,896 A | 10/1981 | Kress et al. |
| D271,683 S | 12/1983 | Clifton |
| 4,492,353 A | 1/1985 | Phillips |
| 6,886,776 B2 | 5/2005 | Wagner et al. |
| 7,188,802 B2 | 3/2007 | Magre |
| 7,472,863 B2 | 1/2009 | Pak |
| D634,257 S | 3/2011 | Alexander |
| 8,485,464 B2 | 7/2013 | Kroo |
| 8,967,526 B2 | 3/2015 | Karem |
| D736,140 S | 8/2015 | Moller |
| 9,221,532 B2 | 12/2015 | Karem |
| 9,242,738 B2 | 1/2016 | Kroo |
| 9,348,333 B1 | 5/2016 | Buchmueller et al. |
| 9,493,226 B2 | 11/2016 | Karem |
| 9,505,484 B1 | 11/2016 | Al-Sabah |
| 9,694,906 B1 | 7/2017 | Sadek |
| D803,724 S | 11/2017 | Zhou |
| 9,868,524 B2 | 1/2018 | Welsh et al. |
| 10,053,213 B1 | 8/2018 | Tu |
| 2005/0133662 A1 | 6/2005 | Magre |
| 2007/0215751 A1 | 9/2007 | Robbins et al. |
| 2008/0277524 A1* | 11/2008 | Brock ............ B64C 1/26 244/36 |
| 2012/0091257 A1* | 4/2012 | Wolff ............ B64C 29/0033 244/12.4 |
| 2013/0092799 A1 | 4/2013 | Tian et al. |
| 2014/0061384 A1 | 3/2014 | Woodworth et al. |
| 2016/0023754 A1 | 1/2016 | Wiegand |
| 2016/0200436 A1* | 7/2016 | North ............ B64C 29/0033 244/7 R |
| 2016/0236775 A1 | 8/2016 | Eshkenazy et al. |
| 2016/0288903 A1 | 10/2016 | Rothhaar et al. |
| 2016/0311522 A1 | 10/2016 | Wiegand |
| 2017/0066532 A1 | 3/2017 | Karem |
| 2017/0203843 A1* | 7/2017 | Chan ............ B64C 39/024 |
| 2017/0240273 A1 | 8/2017 | Yuen |
| 2018/0065737 A1 | 3/2018 | Kroo |
| 2018/0086458 A1 | 3/2018 | Sartorius et al. |
| 2018/0093770 A1 | 4/2018 | Welsh et al. |
| 2018/0134381 A1 | 5/2018 | Rimanelli et al. |
| 2018/0265189 A1 | 9/2018 | Zhang et al. |
| 2018/0273158 A1 | 9/2018 | Courtin |
| 2018/0273170 A1 | 9/2018 | D' et al. |
| 2018/0281941 A1 | 10/2018 | Hutson |
| 2019/0291862 A1 | 9/2019 | Lyasoff et al. |
| 2019/0291863 A1 | 9/2019 | Lyasoff et al. |

FOREIGN PATENT DOCUMENTS

| | | |
|---|---|---|
| GB | 666491 | 2/1952 |
| WO | 2008/127792 A2 | 10/2008 |

\* cited by examiner

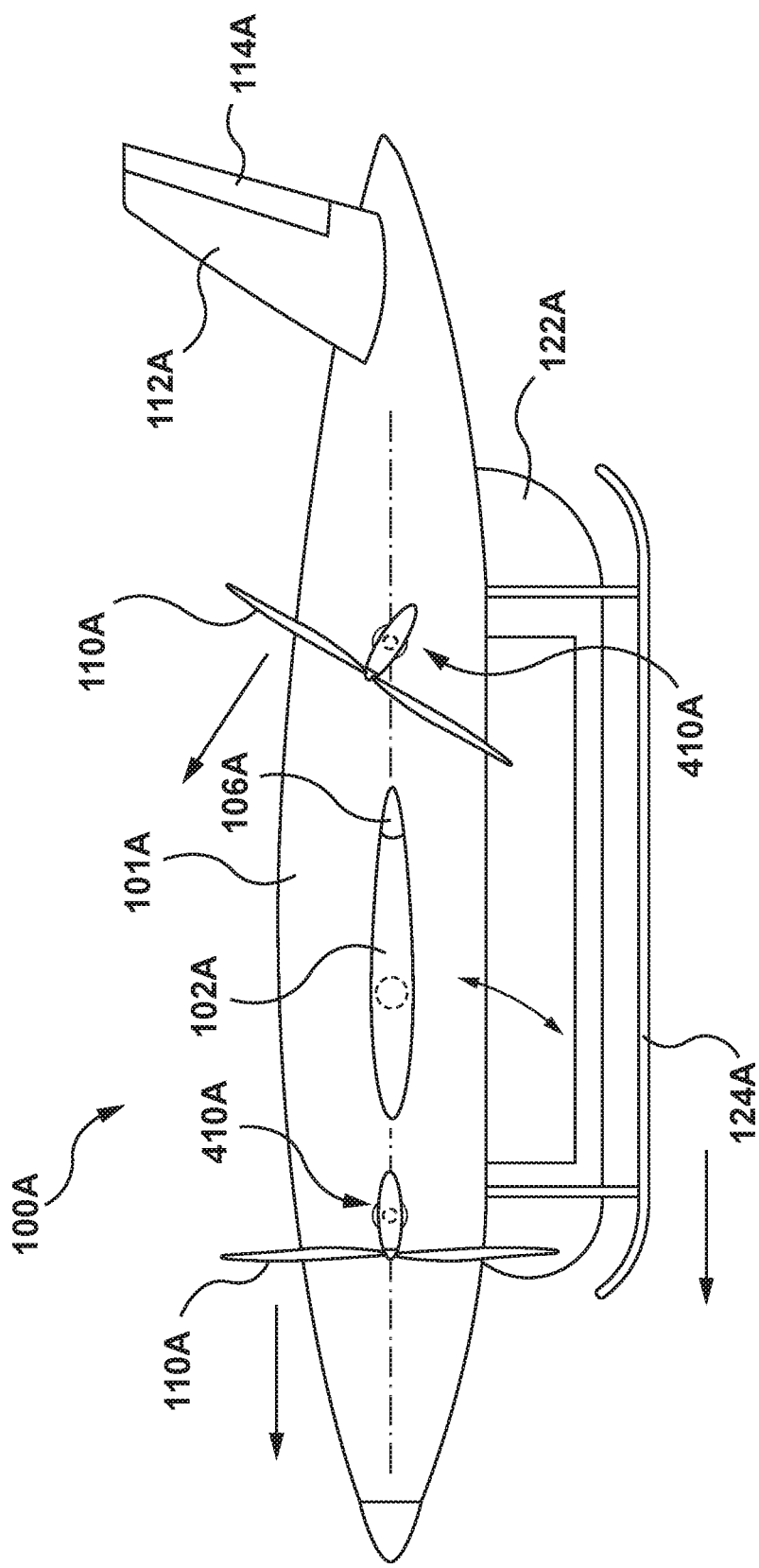

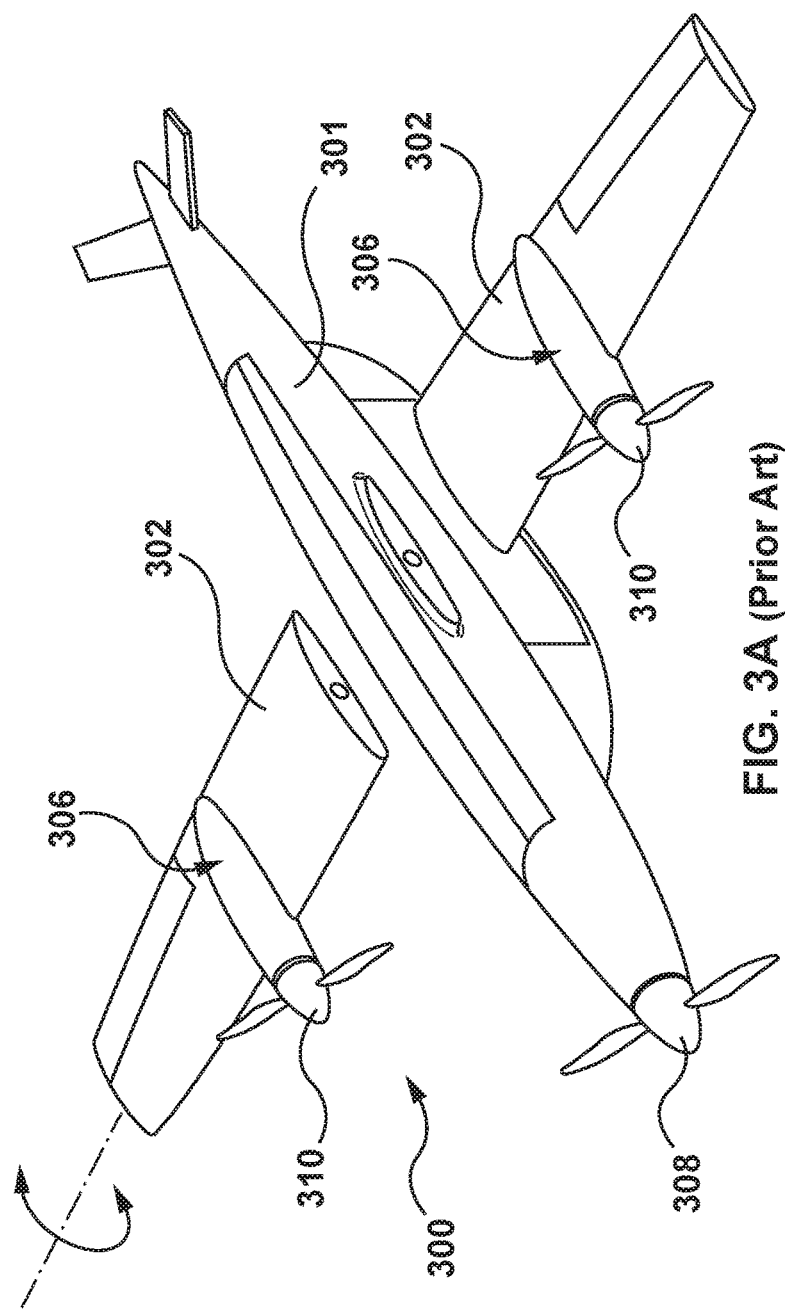
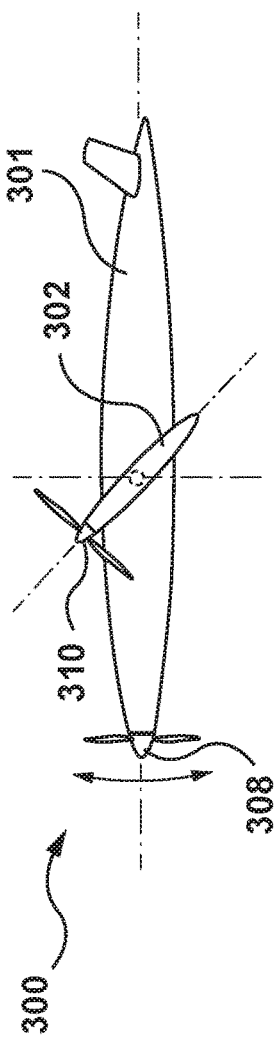
FIG. 3A (Prior Art)
FIG. 3B (Prior Art)

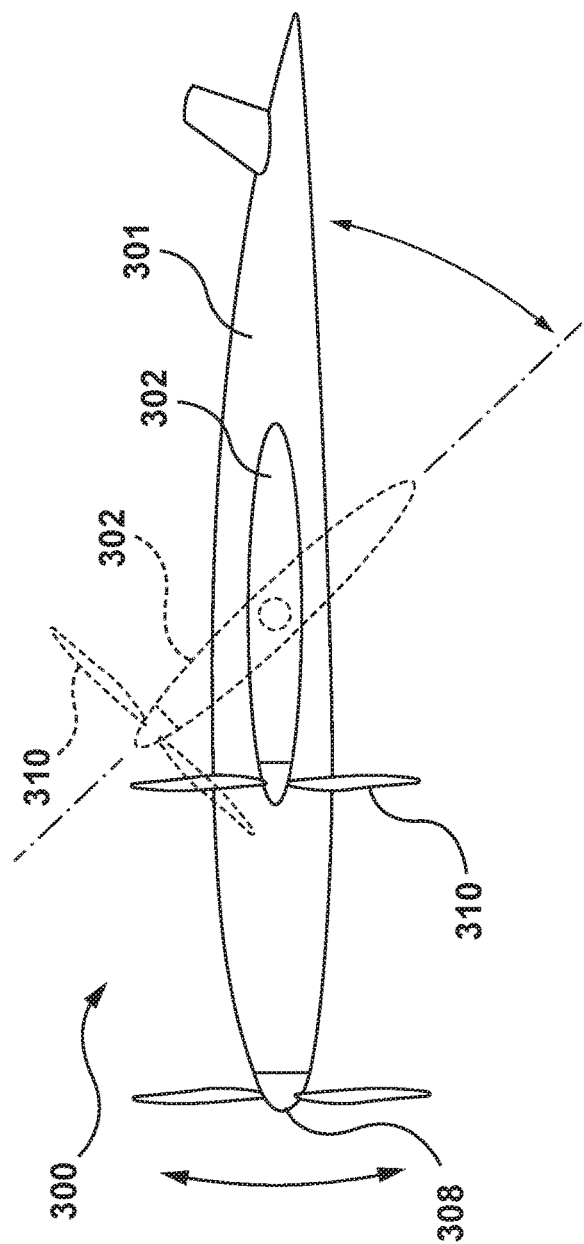
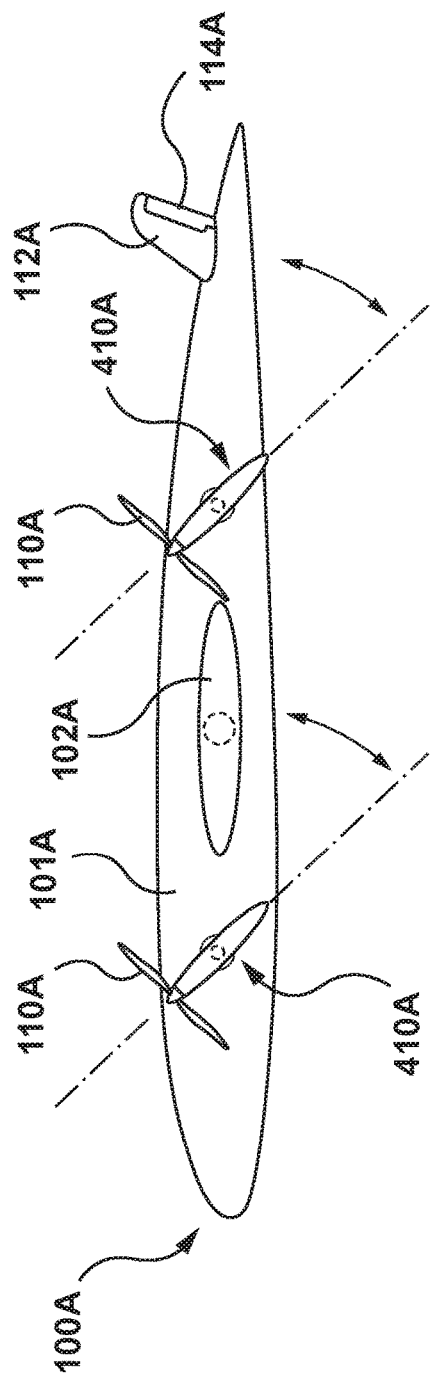
FIG. 4A
FIG. 4B

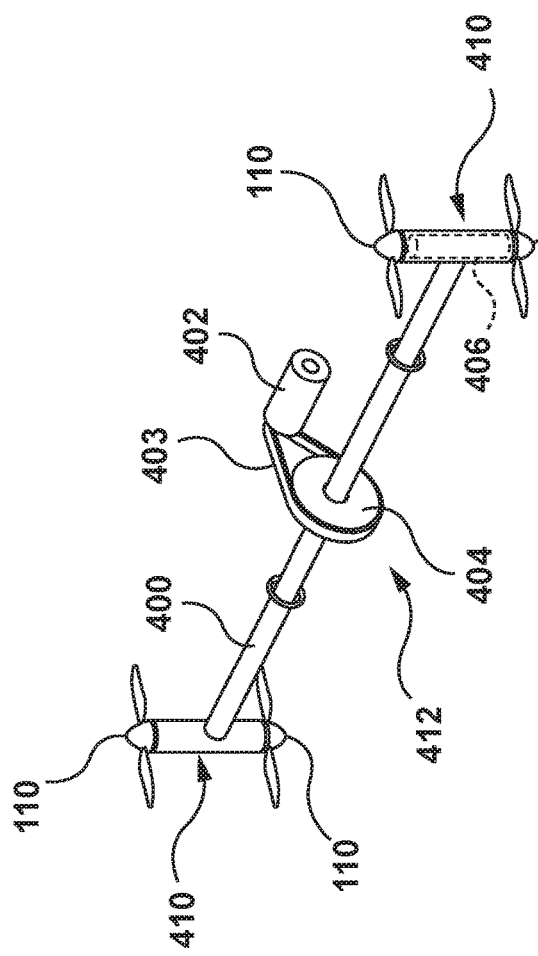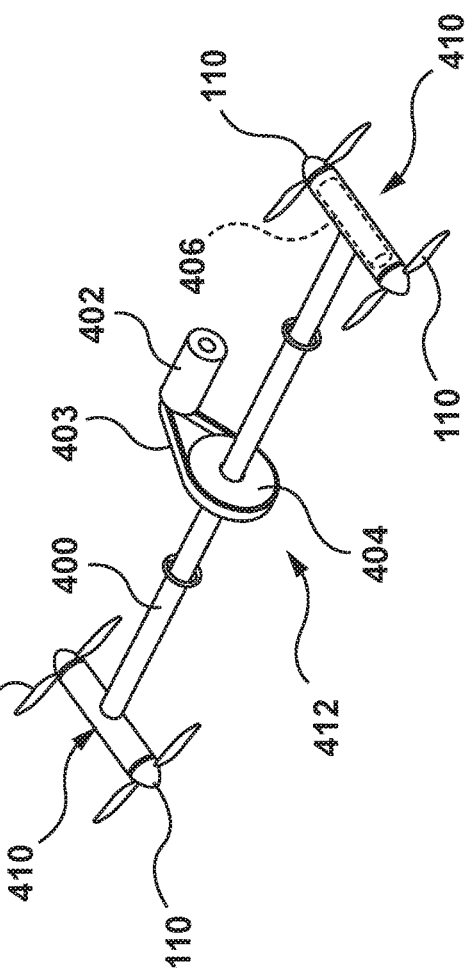
FIG. 6A
FIG. 6B

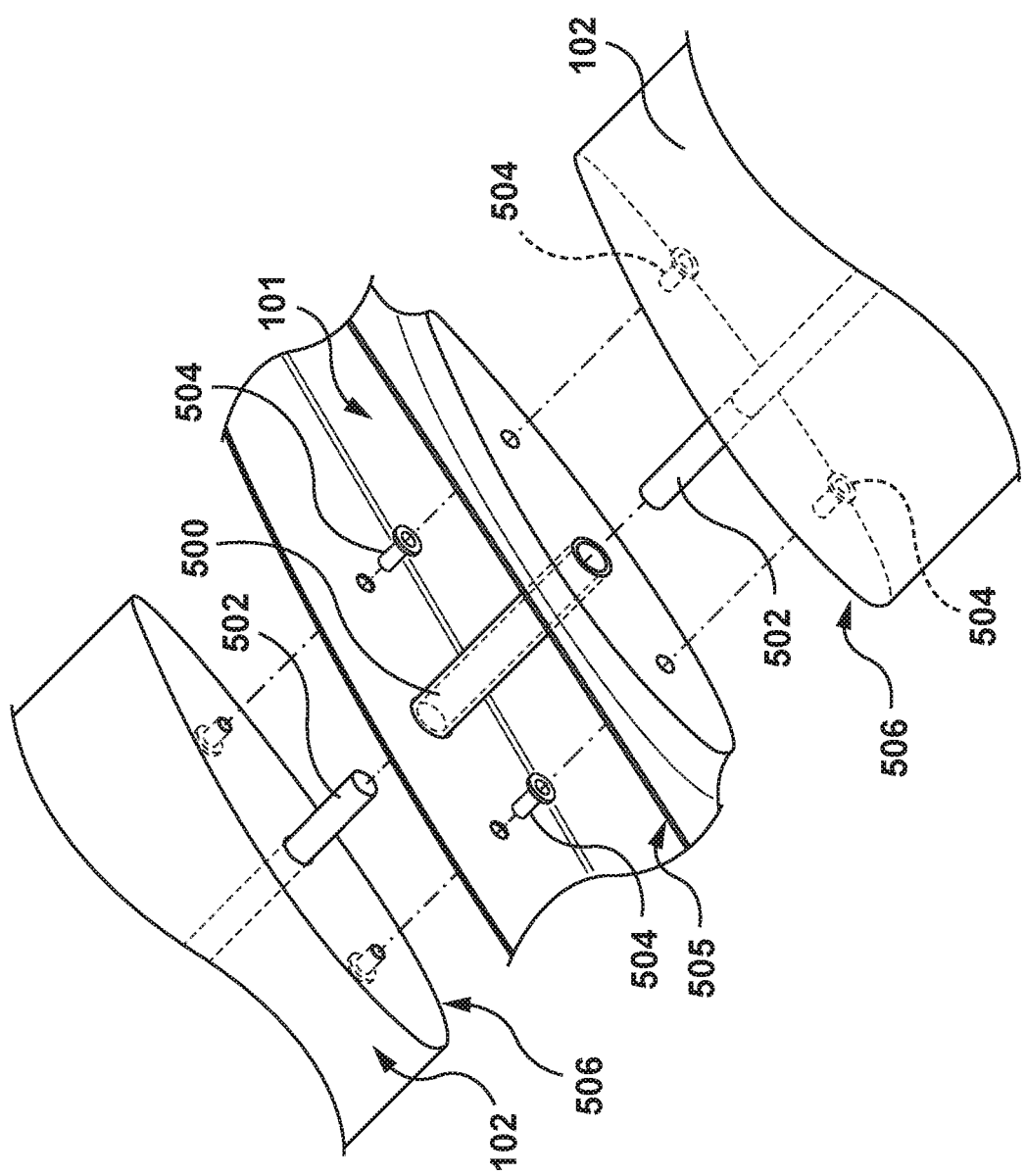

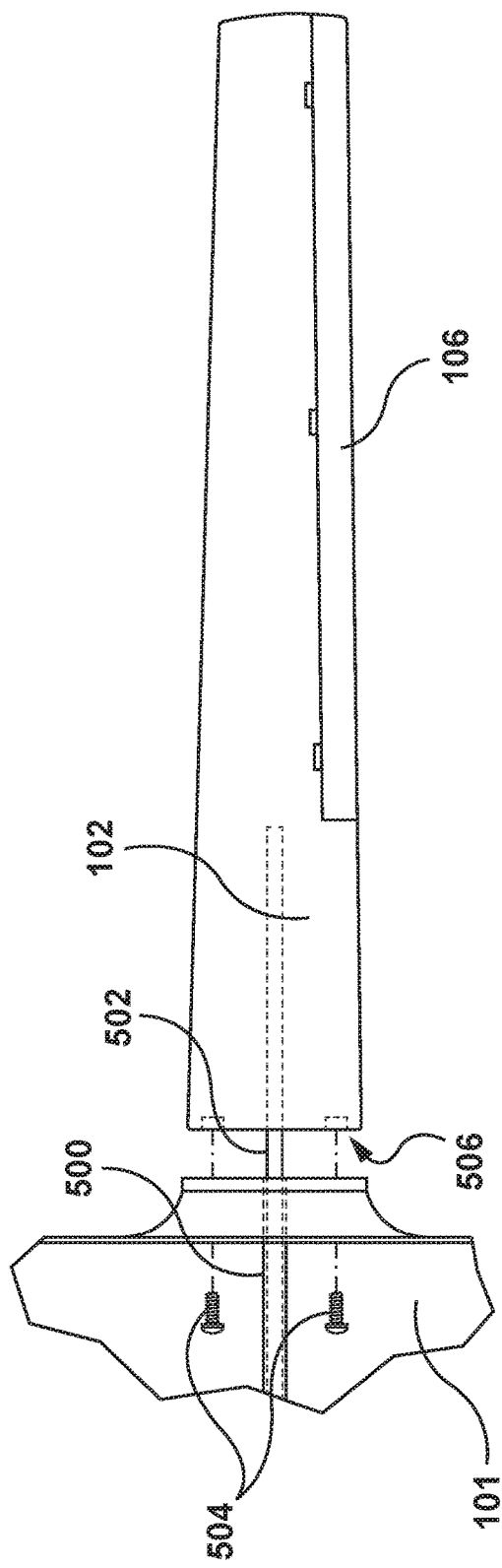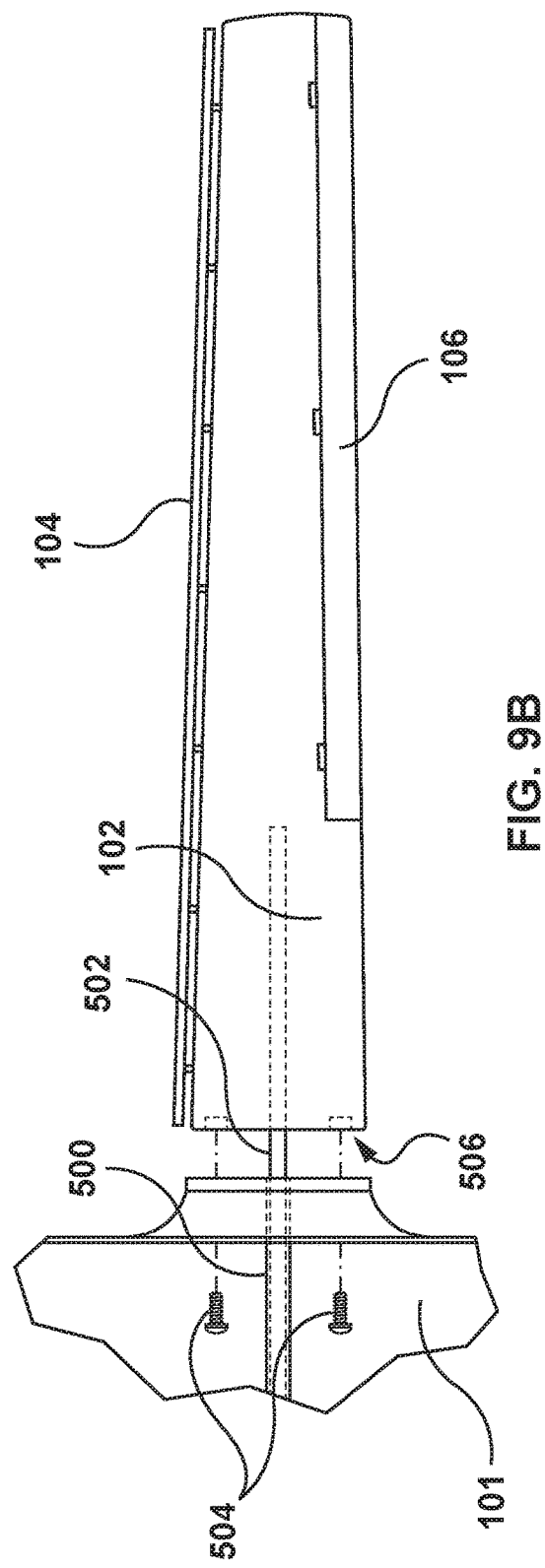

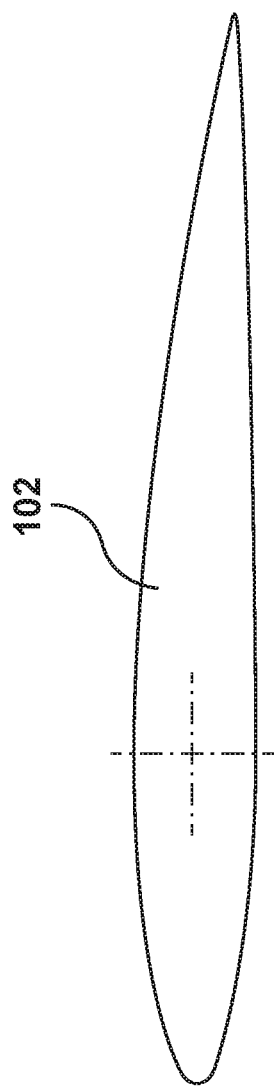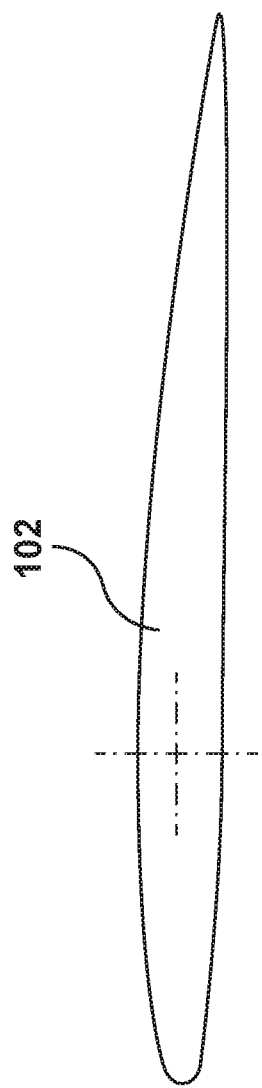

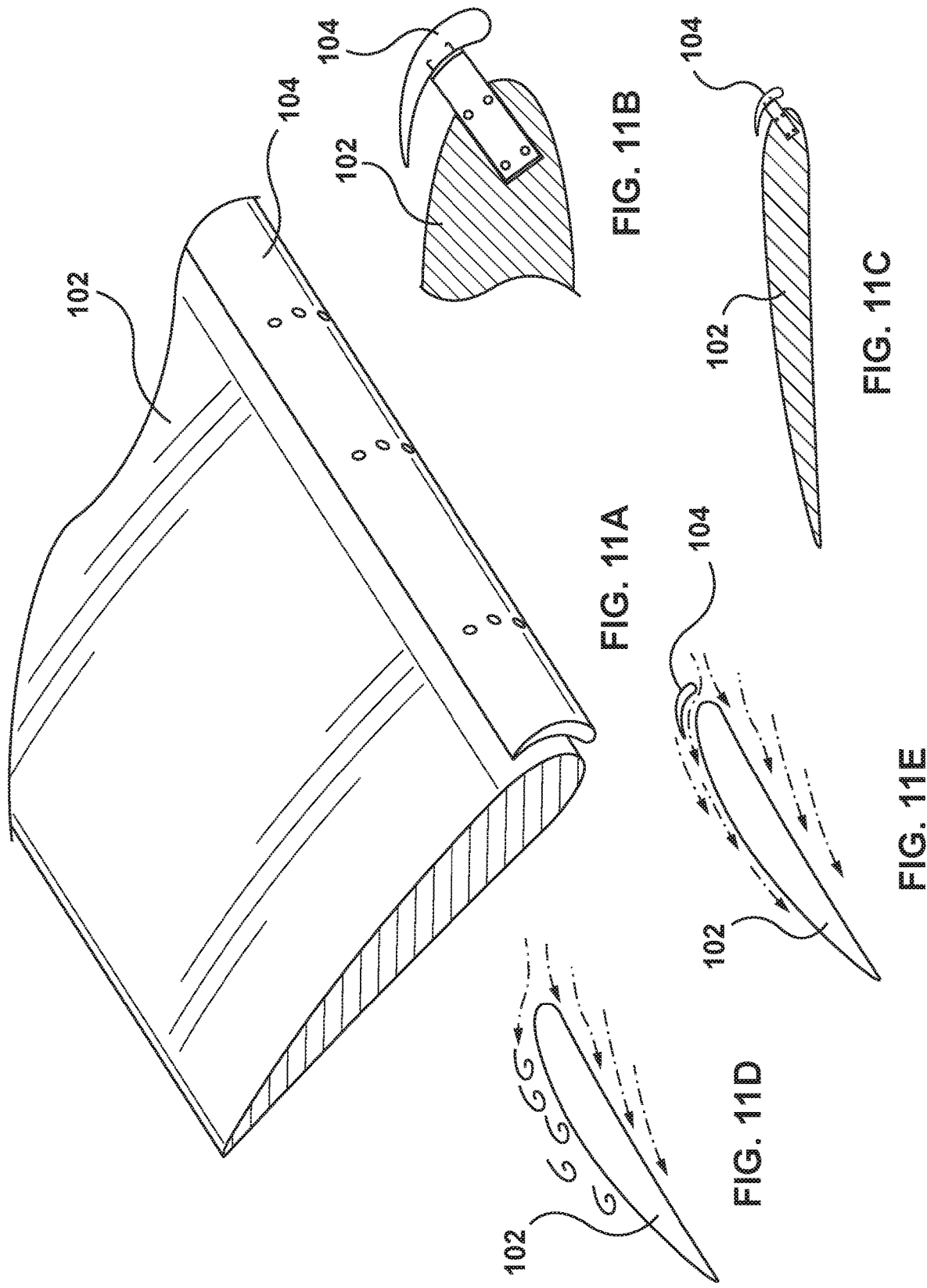

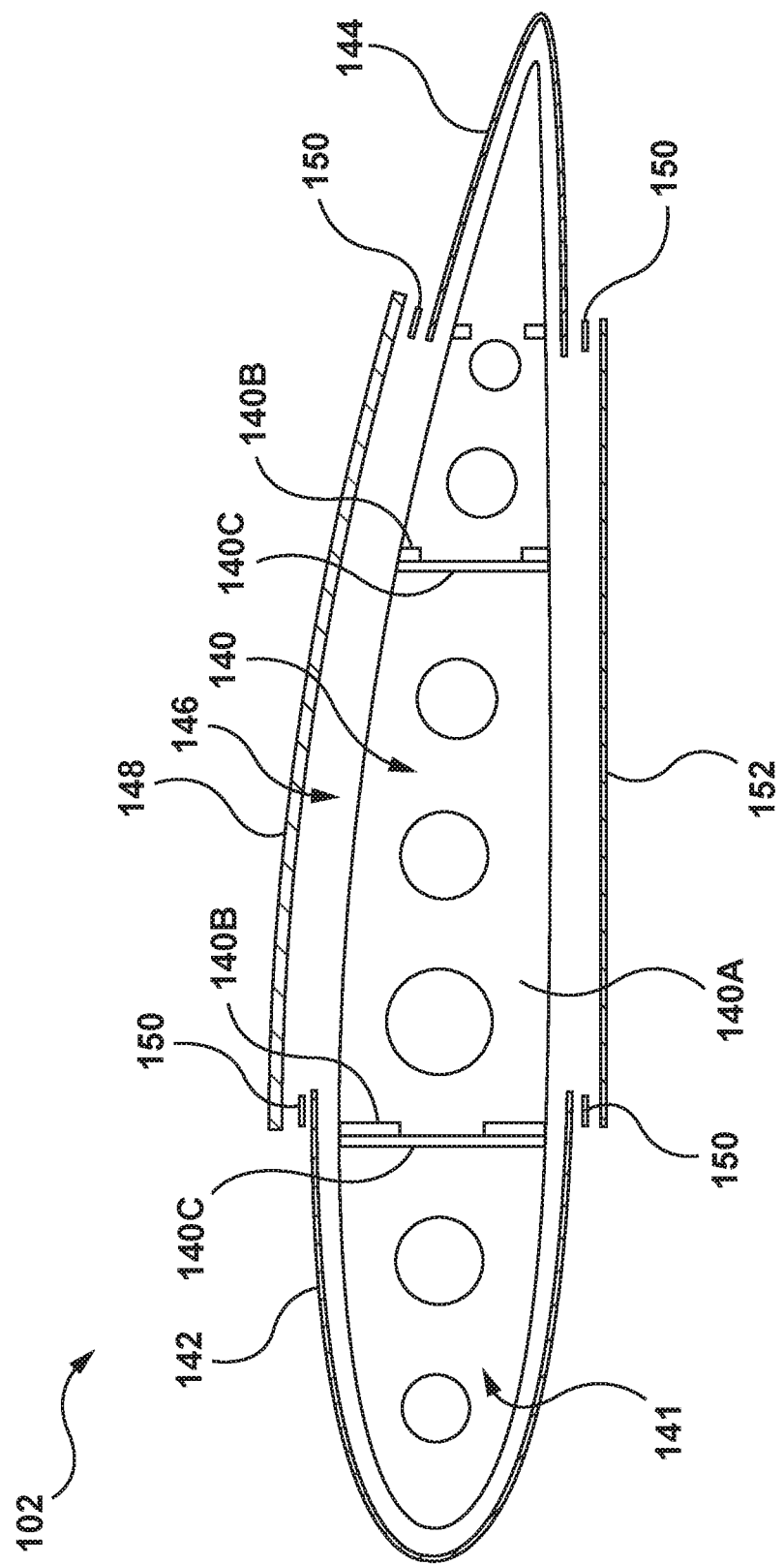

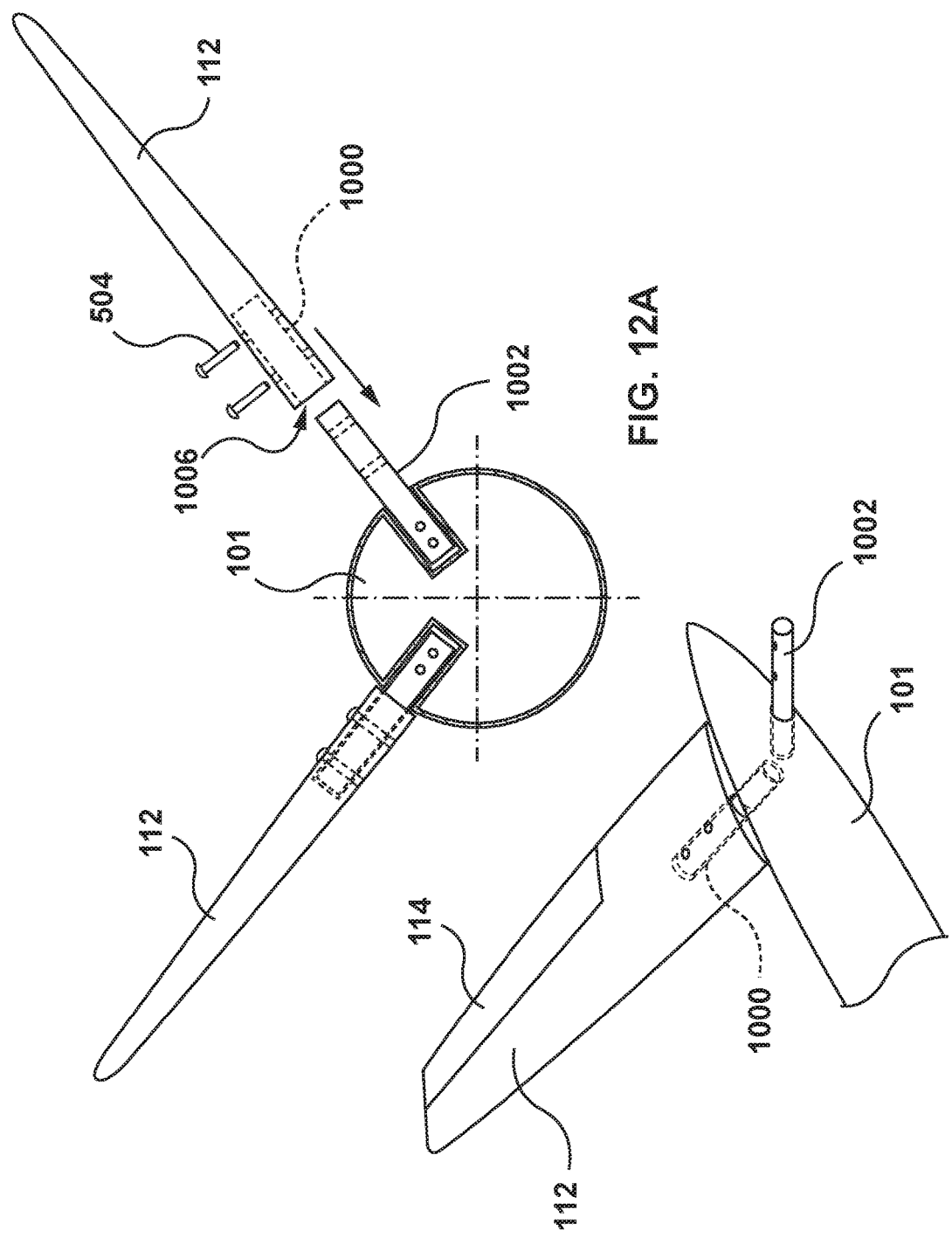

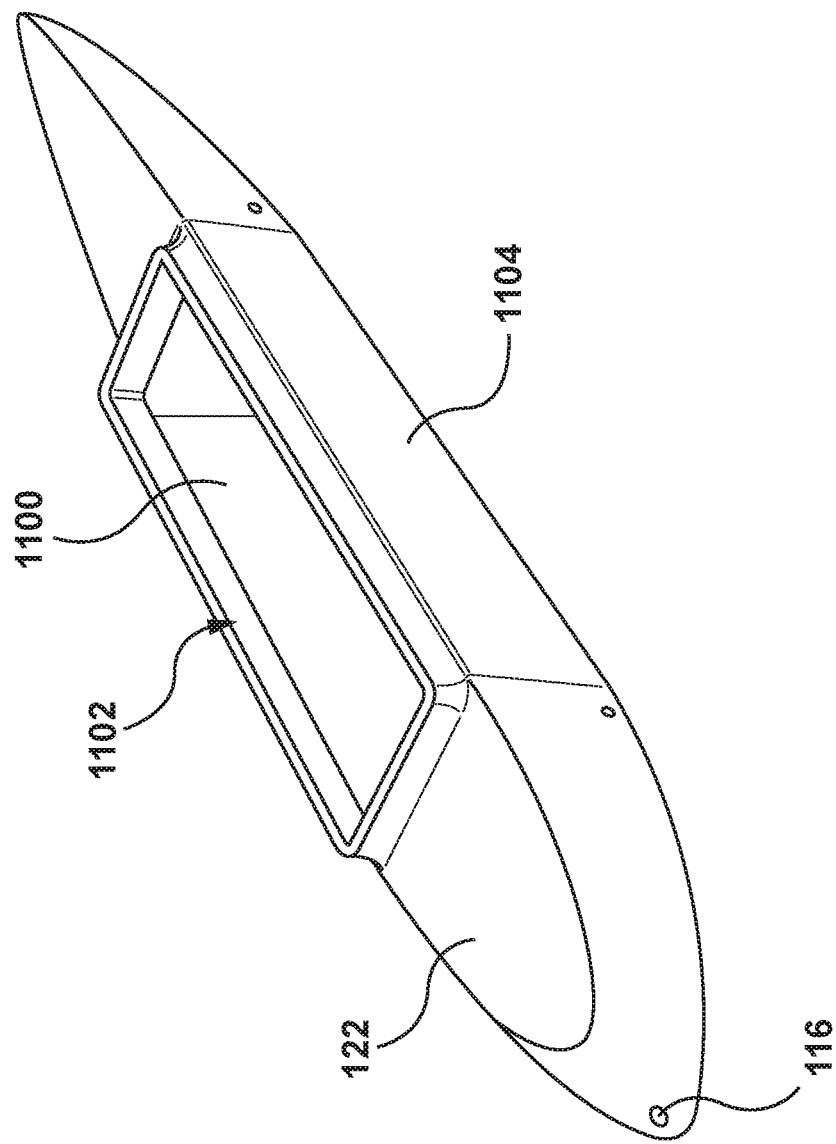

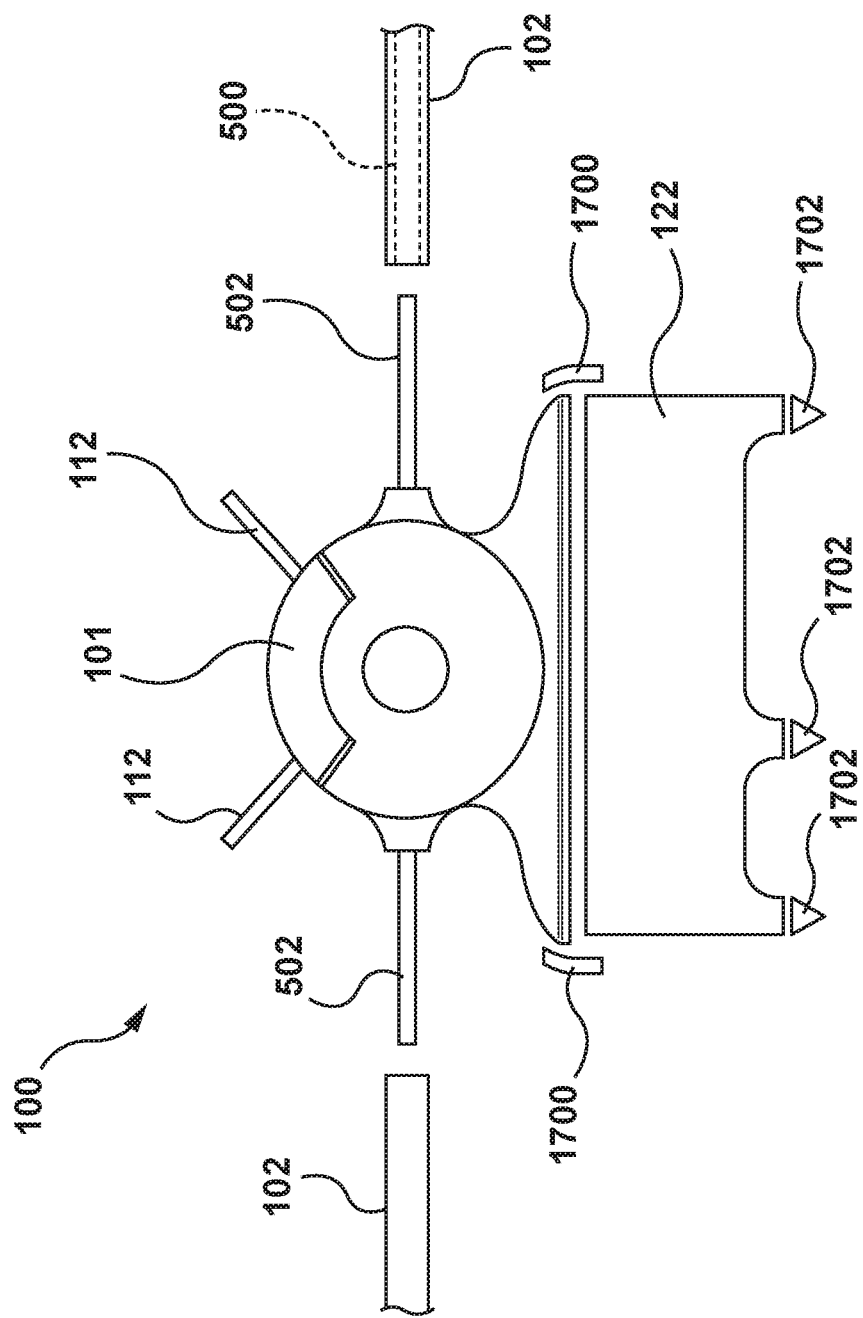

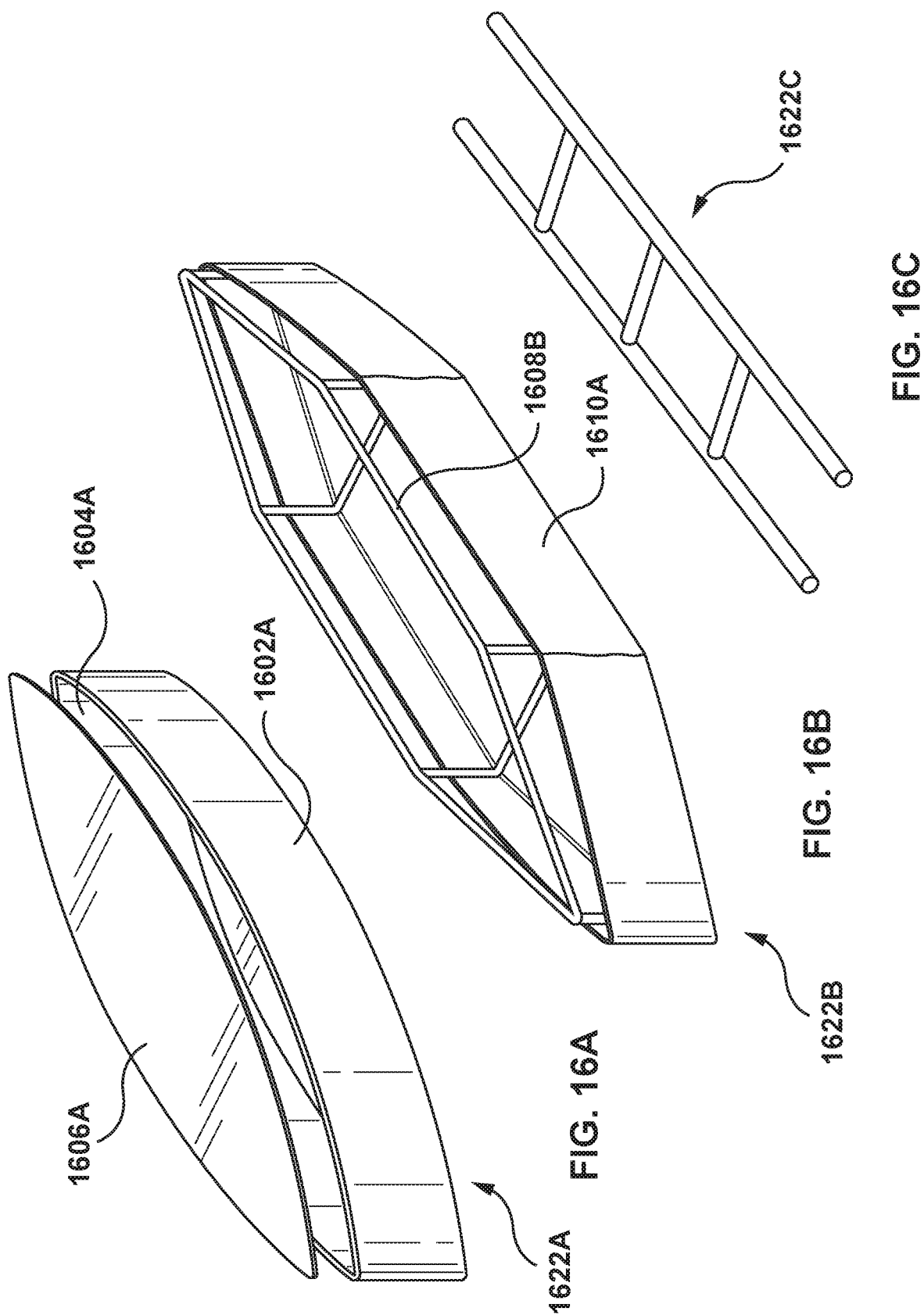

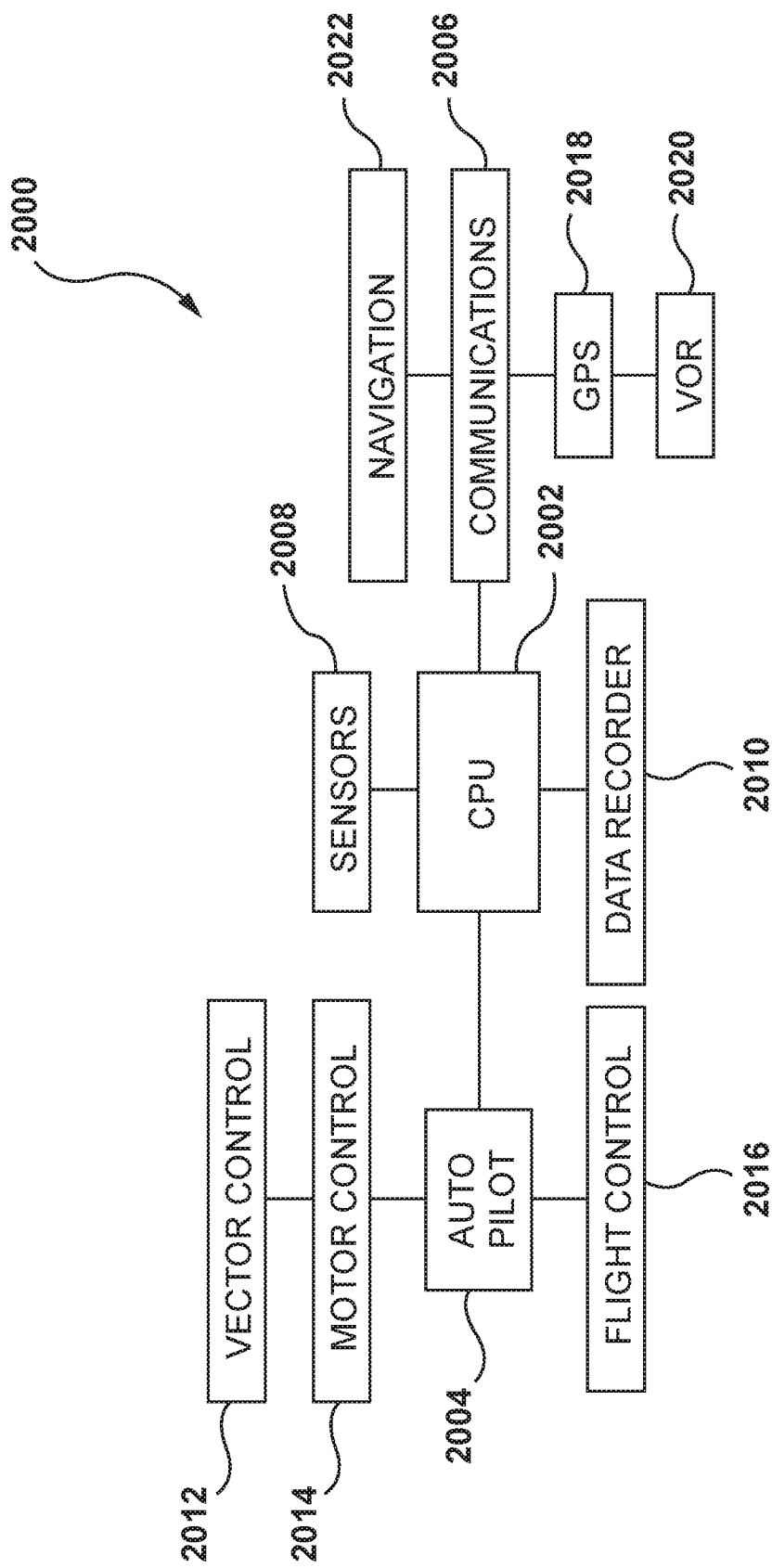

AERIAL VEHICLE WITH ENHANCED PITCH CONTROL AND INTERCHANGEABLE COMPONENTS

CROSS-REFERENCE TO RELATED APPLICATION

This application claims priority to U.S. Provisional Application No. 62/773,513 filed Nov. 30, 2018, the teachings of which are hereby incorporated by reference.

TECHNICAL FIELD

The disclosure herein relates to aircraft designed to operate, carrying significant cargo loads, in modes of both Vertical Take-off and Landing ("VTOL") and forward horizontal flight, and has particular application to a type of aircraft known as an Unmanned Aerial Vehicle (UAV) or drone.

BACKGROUND

UAVs used to carry small cameras or transport other small loads for short distances are known, and are commonly referred to as drones. Many of these drones are considered recreational or toys, and depending on the jurisdiction, may not be covered by civil aviation regulations. Moreover, they typically operate on open free public radio frequencies which make them susceptible to interference. Such UAVs, which tend to resemble small helicopters, are also sometimes referred to as multi-rotors or quadcopters. They are relatively easy to fly, fairly inexpensive and many are equipped for VTOL operations and can work well for such limited purposes. However, such aircraft have some significant downfalls and limitations. They tend to be lightweight in construction, and of limited capacity in terms of distance that can be covered, lifting capacity, and carrying power.

Most current UAV designs are motor and propeller-driven, and are chiefly limited in terms of carrying capacity by their power to weight ratios. This is mainly because a large percentage of their power is directed to achieving stability during lift and forward flight, while providing sufficient power to do so with adequate control of pitch. In the case of battery powered UAVs, adding more batteries means adding more weight, which in turn requires larger and heavier motors and results in any event in a limitation to the distance they can travel and the additional cargo they may carry. It would be highly beneficial to develop larger UAVs with greater carrying capacity, as well as greater potential range in terms of distance. Such a UAV would also ideally have additional features such as "Sense and Avoid" type radar capabilities when dealing with other aircraft encountered along the flight path.

There are some UAV designs that resemble airplanes in that they have wings, rather than being helicopter-like drones. Such plane-like UAV designs will generally have superior lifting power and distance potential compared to a helicopter-like drone, due to the added advantage of lift achieved by using wings. However, existing designs still provide for further inefficiencies that limit their cargo carrying ability and distance potential. This is partially because the typical design is not ideally suited for all flight conditions and load conditions. For instance, to fly a UAV for very long distances at a relatively higher speed carrying a light load, it is more efficient in terms of energy consumption to use higher aspect ratios and thinner, longer wings on the UAV, which provides for a more aerodynamic, glider-like profile. For carrying heavier loads for shorter distances at relatively slower speeds, the ideal wings to use would be much broader and flatter than those for long distance travel, and may be equipped with additional accessories such as slats on the leading edge of the wing to enhance the coefficient of lift. Similar adjustments to the dimensions of the tail fins can further increase the efficiency of operation of the UAV depending on the operating conditions. More broadly, the optimal wing and tail configurations for a given aircraft depend on whether the flight plan is for a short or long-haul flight, and the volume and weight of cargo to be carried.

However, most UAVs of existing designs have permanently secured wings and tail fins which are directly attached to the fuselage, and the wings in particular are encumbered by attached propellers. The fixed nature of existing wing designs renders the aircraft less adaptable for a range of possible flight conditions and distances. This tends to compromise the aircraft's flight performance and fuel or energy efficiency. This design also suffers from adverse pitch effects, due to their location along the pitch axis running through the wing, which corresponds to the center of gravity.

There is a need to develop unmanned aircraft that are capable of carrying heavier loads, and flying for larger distances, or ideally, both. Such UAVs would be particularly useful for delivering relief supplies such as water, food, and medical supplies to remote or war-torn locations where it may be too dangerous to send a manned aircraft. Another use case is where refuelling options are highly limited such that the return flight to home base cannot be assured, for example due to poor weather conditions. Also, such a UAV could be put to good use in other applications, such as the efficient delivery of loads of consumer goods to warehouse locations, even those located in urban or densely populated environments where there is little space for take-off and landing. Another use is for dangerous operation such as fighting forest fires, and storm chasing to collect weather data in extreme conditions.

SUMMARY

According to one aspect of the present disclosure, an aircraft is provided in which the weight of the aircraft is borne by the vectoring motors during VTOL until the aircraft can obtain significant forward flight whereby the weight is than transferred to the wings. The disclosure provides a configuration and lateral placement for motors and accompanying propellers, which serve to provide enhanced stability and pitch control to the aircraft, even when it is encumbered with a significant load of cargo, is flying in inclement weather, or during transition from vertical to horizontal flight. The transition from vertical flight to horizontal flight is further enhanced by using sequential vectoring thrust which allows the forward motors to vector at a different speed and angle than the rear motors which still may be providing more horizontal thrust until the aircraft can reach a speed above the stall speed of the wing.

Aircraft according to the disclosure may also provide greater safety by using a number of systems not currently implemented on unmanned aircraft such as a terminal-to-terminal ground based system, Automated Weather Observing System (AWOS), Traffic Collision Avoidance System (TCAS), Automated Dependant Surveillance Broadcast (ADS-B), forward looking radar and position transmission in which the aircraft determines its position via satellite navigation and periodically broadcasts its position enabling it to be tracked by control tower personnel and other air traffic control providers. These systems may communicate, for example by hard wiring, with flight control and autopilot systems that control the mechanical surfaces of the aircraft.

Also provided are structures for interchanging wings and tail fins between flights so that the UAV can be adapted to efficiently fly under varying weather conditions and loads. This is advantageous since in some cases the UAV may be operated in very remote regions where access to spare parts may be limited or non-existent. The UAV may also be outfitted with engines that can operate using hybrid energy sources, and includes installed rechargeable batteries that can be used with a charging platform. The UAV of the disclosure can also be optimized for flight operations by a controller using embedded software that configures the UAV and adjusts its operations depending on conditions and parameters it receives for the desired flight.

In one aspect, the disclosure relates to a propeller-driven aircraft, for example a UAV, having at least one pair of wings, as well as a minimum of four motor-driven propellers which serve as vectoring rotors and are carried by the fuselage rather than by the wings. In a preferred embodiment, there are eight propellers arranged in pairs. Each of a given pair of propellers is joined to the other by a perpendicularly oriented shaft containing at least one motor for turning the propellers. Two of the pairs of propellers are secured on the ends of a rotatable crossbar that is in turn secured through the fuselage, in front of an attachment point for the wings. Two of the pairs of propellers are similarly secured via another rotatable crossbar that is located behind an attachment point for the wings. Overall, in the preferred embodiment, the four pairs of propellers form the vertices of a rectangle when viewed from above the aircraft, with the centre of gravity residing between the attachments points for the wings, and at the centre of the rectangle formed by the pairs of propellers.

The shafts connecting the members of a given pair of propellers may be turned into a substantially vertical position when the UAV is taking off or landing. This results in the attached propellers becoming substantially horizontal, so that they can provide the UAV with the necessary lifting force to power VTOL operations. VTOL operations are particularly advantageous where there is limited space, or in remote regions lacking infrastructure. During forward flight conditions, the shaft and propellers can be rotated into a forward facing position to assist in efficiently powering forward flight. Significantly, in the described rectangular configuration for the crossbars and propellers, there will be superior ability to control the pitch of the UAV during VTOL operations, as those propellers located behind the wings can assist in finely balancing any destabilizing forces resulting from operation of the forwardly located propellers. Preferably, forward propellers can be moved between a horizontal position and a vertical position independently of movement of the rearward propellers between a horizontal position and a vertical position, to facilitate a smooth, controllable transition from vertical flight to forward horizontal flight; this process is referred to as sequential vectoring thrust.

In a further aspect, the disclosure relates to a propeller-driven UAV having modular wings and, optionally, tail fins that can be detached and exchanged depending on flight conditions. Different shaped components may be used as appropriate for longer haul flights, heavier loads, or other variations in operating conditions. Thicker and shorter wings generally mean heavy lift and slower speeds and thinner longer wings mean faster speeds. Using the ideally shaped wings and fins for a given set of conditions results in the UAV being more efficiently able to fly longer distances on a single charge or load of fuel.

In a further aspect, the UAV of the disclosure may be powered by a conventional liquid fuel source such as gasoline or hydrogen, one or more rechargeable batteries, or with a hybrid fuel source which utilizes both energy sources. In a preferred embodiment, the aircraft may utilize hybrid engines to maximize versatility and distance that can be travelled on a single tank of fuel and charge of batteries. In a further preferred embodiment, the disclosed UAV could use exclusively hydrogen fuel cell or clean electric power, which would result in the UAV generating zero carbon emissions. The UAV may be configured to be operated with a landing pad located at its home base that includes conductive (e.g. metallic) charging rings, that can, under the weight of the aircraft, come into physical contact with corresponding connection points on the UAV to recharge the batteries upon landing.

In a still further aspect, the UAV is equipped with a cargo-carrying container which is detachably secured to the bottom of the aircraft. This may take any shape but in a preferred embodiment, has an aerodynamic shape to reduce drag on the UAV as it engages in forward flight. The cargo container may be loaded by personnel with appropriate goods to be sent to a destination, then unloaded at the destination and sent back empty or loaded with return goods.

In a further aspect, the UAV is equipped with a control panel comprising at least a processor and memory storing instructions for monitoring and controlling operations of the aircraft. The control panel may further be configured to communicate with external devices located on the aircraft (e.g. sensors and flight controls). The control panel may comprise components and execute operations similar to those known from conventional aircraft and be further customized in operation via the stored instructions to, for example, sense external and internal conditions and control operations of the aircraft for optimum flight and security measures. For example, the instructions when executed by the processor may be configured to monitor parameters such as weather conditions, air pressure, wind speeds, and location information. The instructions when executed may further cause the processor in the UAV to transmit data to a controller located remotely (e.g. across a communication network such as a radio micro-link communication network) or in proximity to the UAV's terminal. The controller, which is operated by trained personnel, also comprises a processor and a memory storing software instructions. The instructions when executed by a processor can be used to direct all aspects of the UAV's operation, including takeoff, landing, targeted destination, and velocity. The software instructions when executed by the processor of the controller may be further capable of individually controlling the propellers connected to the fuselage in terms of angle and rotational speed. The software instructions when executed by the processor of the controller can also consider whether such measured control panel parameters, such as those indicating highly unfavourable weather conditions, may impact or override instructions to proceed with a given route given from a person operating the controller. The software instructions when executed by the processor of the controller can also receive an indication from one or more sensors of the amount of load being carried on a given trip, and the instructions are then configured upon receiving said indication to adjust the operating instructions accordingly.

In a still further embodiment, the UAV and cargo container are equipped with computer-implemented proximity and/or identity sensors, such as fingerprint scanners, retinal scanners, electronic badge detectors or the like. Data from such sensors may be integrated with other data being sent to the controller and interpreted by associated software. There may further be locking mechanisms on the UAV or the cargo container which may only be unlocked by the operator or by the integrated software upon sensing that an authorized individual has approached the UAV or container. This feature provides enhanced levels of safety and security to the UAV and to the operator.

In a further aspect, the charging pad of the UAV described above may include apparatus for secure data transfer from the UAV to the controller. The data being transferred may include details about the immediate past flight taken by the UAV, the unloading or loading of cargo, or the environmental conditions encountered during flight. Such data may be used for general record keeping or for other purposes such as to optimize future versions or modules of the operating software.

The present disclosure may also provide for a UAV with increased carrying capacity and increased range of travelable distance, due in part to the operation of engines which incorporate power from liquid fuel as well as from rechargeable batteries that may be charged as the UAV sits on its home base charging pad. The UAV can also be aerodynamically optimized, and therefore able to travel longer distances on a single tank of fuel or a single charge, as its wings are modular and can be exchanged depending on the load being carried and the distance to be travelled. The operation of the UAV can be controlled by the use of a controller which may be located remotely or proximate to the UAV's home base. The software used with the controller can be used to direct and optimize the flight by considering factors such as multiple environmental and weather conditions, weight of cargo, and distance to be travelled. The UAV and its associated cargo container may also be equipped with apparatus for sensing proximity and for securely allowing authorized individuals to approach and access the UAV or the contents of the container.

In one aspect, the present disclosure is directed to an aircraft capable of vertical take-off and landing, comprising a fuselage, a central processing unit carried by the fuselage, a first pair of aerodynamic, lift generating wings extending from the fuselage and a plurality of vectoring rotors carried by the fuselage, independently of the wings, and configured to be controlled by the central processing unit. The first pair of wings are modular and removably connected to the fuselage and configured to be interchangeable with an alternate pair of wings, and removal of the wings from the fuselage leaves the vectoring rotors rotatably carried by the fuselage.

In another aspect, the present disclosure is directed to an aircraft capable of vertical take-off and landing, comprising a fuselage, at least one processor carried by the fuselage, a first pair of aerodynamic, lift-generating wings extending from the fuselage and a plurality of vectoring rotors rotatably carried by the fuselage so as to be rotatable between a substantially vertical configuration relative to the fuselage and a substantially horizontal configuration relative to the fuselage and configured to be controlled by the at least one processor, wherein the vectoring rotors are unsupported by the first pair of wings.

The vectoring rotors may be carried by rotor shafts carried by the fuselage so as to be rotatable relative to the fuselage, and the vectoring rotors may be in a first position during vertical flight and in a second position during horizontal flight. The vectoring rotors may transition from the first position to the second position by rotating the rotor shafts along a rotational axis upon receipt of a flight control signal from the central processing unit. In some embodiments, rotation of the rotor shafts by 90 degrees transitions the vectoring rotors between the first position and the second position; rotation of the rotor shafts by less than 90 degrees may cause the vectoring rotors to take on an intermediate position between the first position and the second position. The rotor shafts may be arranged in pairs wherein each pair of rotor shafts rotates independently. Rotation of the rotor shafts may be driven by a turret drive. In some embodiments, the vectoring rotors are configured around the center of gravity of the aircraft.

In some embodiments, the aircraft is an unmanned aircraft.

In some embodiments, the first pair of wings is secured to the fuselage by inserting wing support tubes extending from the root ends of the first pair of wings into wing tube sleeves mounted in the fuselage. In other embodiments, the first pair of wings is secured to the fuselage by inserting wing support tubes extending from the fuselage into wing tube sleeves mounted in the root ends of the first pair of wings. Preferably, the alternate pair of wings is configured to be secured to the fuselage at the same position as the first pair of wings. The first pair of wings and the alternate pair of wings may have different aerodynamic configurations.

In some embodiments, at least one first tail fin is secured to the rear of the fuselage. The tail fin(s) may be modular and interchangeable with at least one alternate tail fin, which may be configured to be secured to the fuselage at the same position as the at least one first tail fin. The first tail fin(s) and the alternate tail fin(s) may have different aerodynamic configurations.

In some embodiments, a first cargo container may be secured to the underside of the fuselage. The first cargo container may be modular and interchangeable with an alternate cargo container, which may be configured to be secured to the fuselage at the same position as the first cargo container. The first cargo container and the alternate cargo container may have different designs.

In some embodiments, the aircraft may further comprise a nose propeller. The aircraft may be hybrid powered using liquid fuel and electricity.

BRIEF DESCRIPTIONS OF THE DRAWINGS

FIG. 1B depicts a side view of the UAV of FIG. 1A showing sequential vectoring thrust.

FIG. 3A depicts a perspective view of a typical airplane-style UAV of the prior art, in partially exploded form.

FIG. 3B is a side schematic view of the prior art UAV of FIG. 3A, shows how problems with the pitch of the aircraft may result, particularly during take-off conditions.

FIGS. 4A and 4B further show the contrast in terms of potential issues with pitch by showing (FIG. 4A) a side view of a prior art embodiment with single propellers on the wing, and (FIG. 4B) a side view of the dual rotation design of the disclosure in which propellers are attached through the fuselage, independent of the wings.

Figure 1:
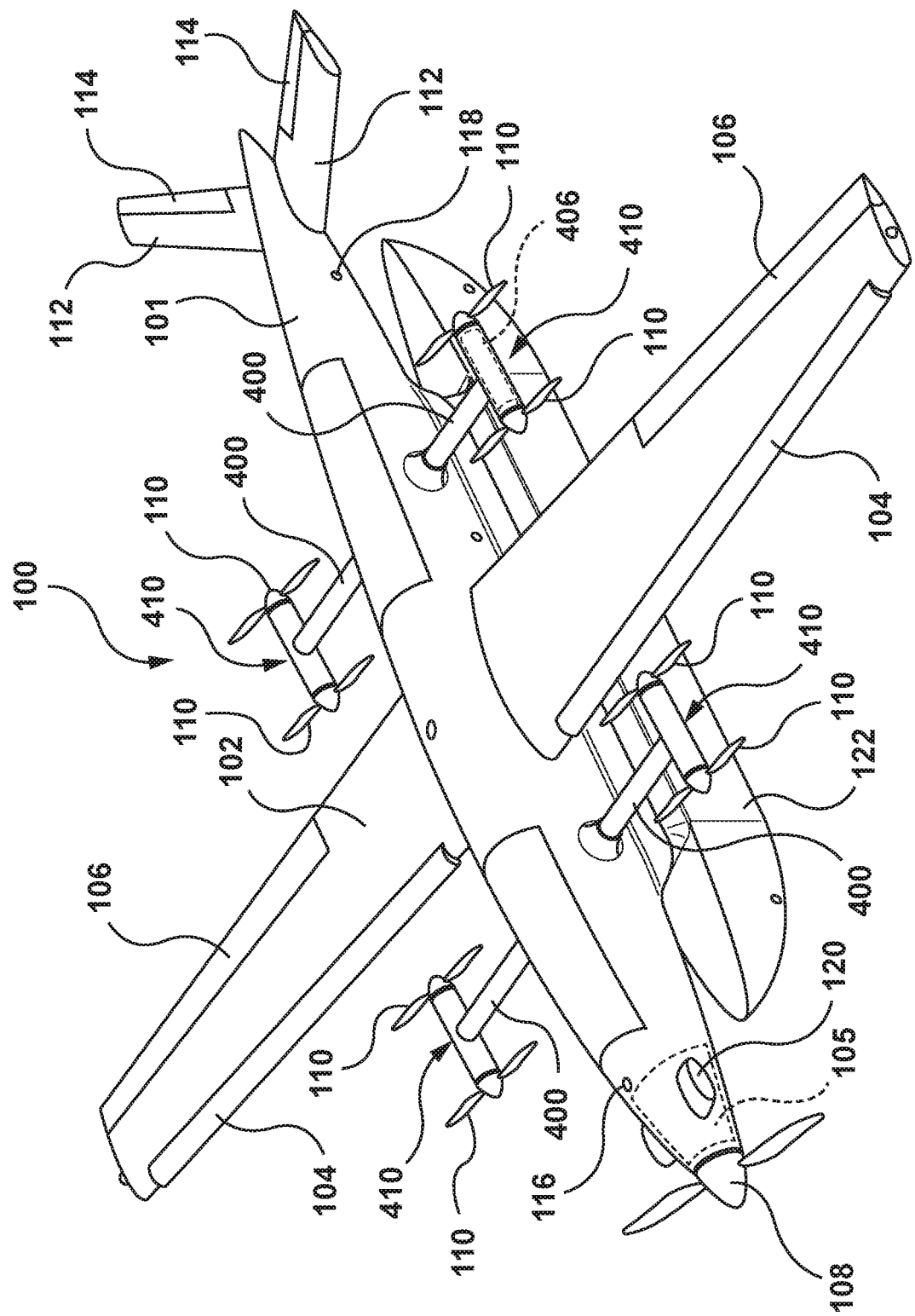
FIG. 1 depicts a perspective view of a first embodiment of a UAV in horizontal/forward flight position.
Figure 5:
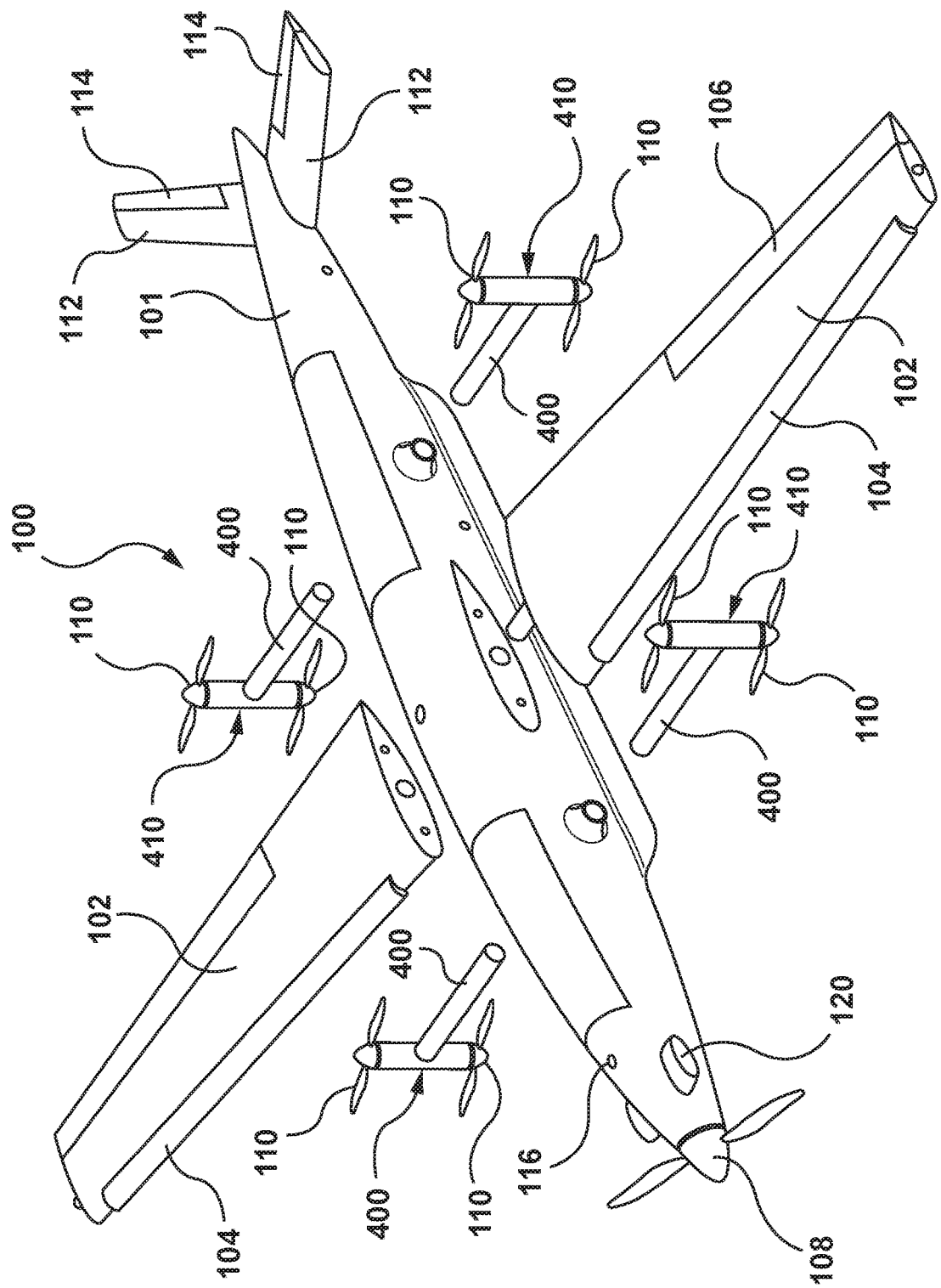

FIG. 5 depicts a partially exploded perspective view of the UAV of FIG. 1 with the propellers shown in a horizontal orientation, as would be appropriate for take-off and landing operations.

FIGS. 6A and 6B depict a detailed perspective view of a first illustrative turret drive mechanism that is employed with a crossbar having installed shafts and propellers. FIG. 6A is shown with the propellers in the horizontal position prior to take off and FIG. 6B is shown with the propellers in a vertical position for forward and level flight.

Figure 1A:
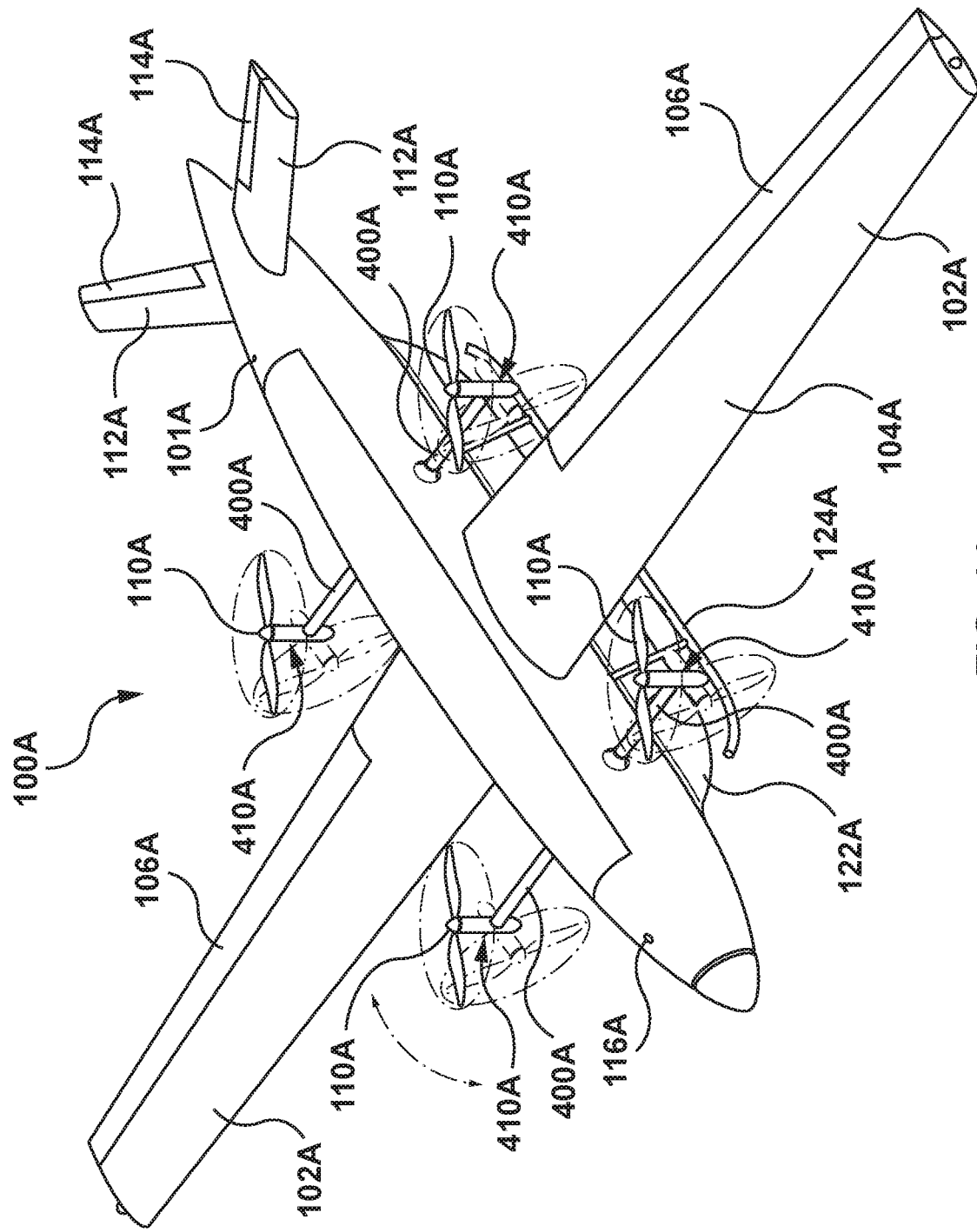
FIG. 1A depicts a perspective view of a second embodiment of a UAV showing sequential vectoring thrust.
Figure 6C:
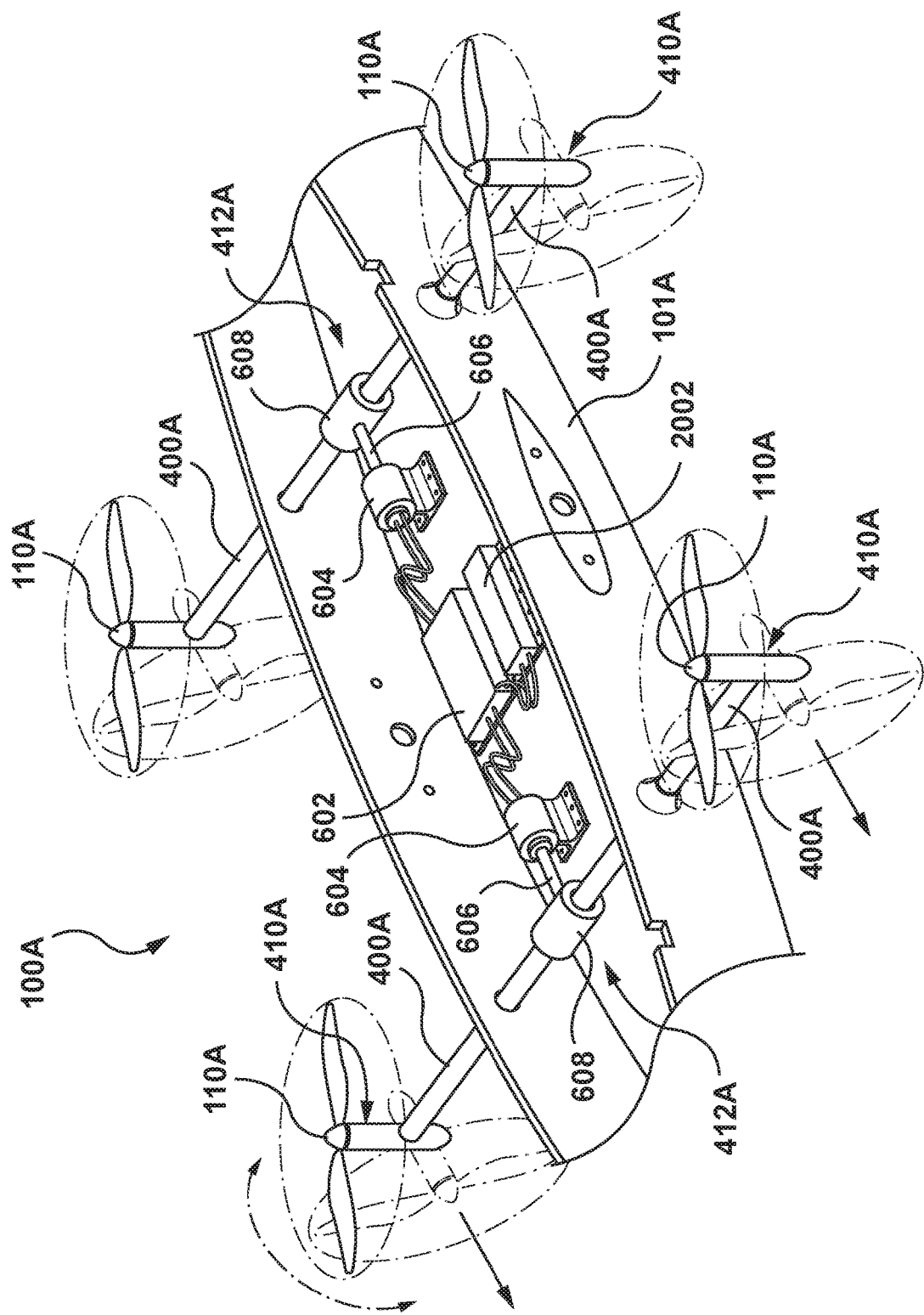

FIG. 6C is a perspective view of the UAV shown in FIG. 1A with the cover removed to expose internal components;

FIG. 7 depicts a detailed section view of components for securing a wing tube through the fuselage of the UAV shown in FIG. 1.

Figure 8:
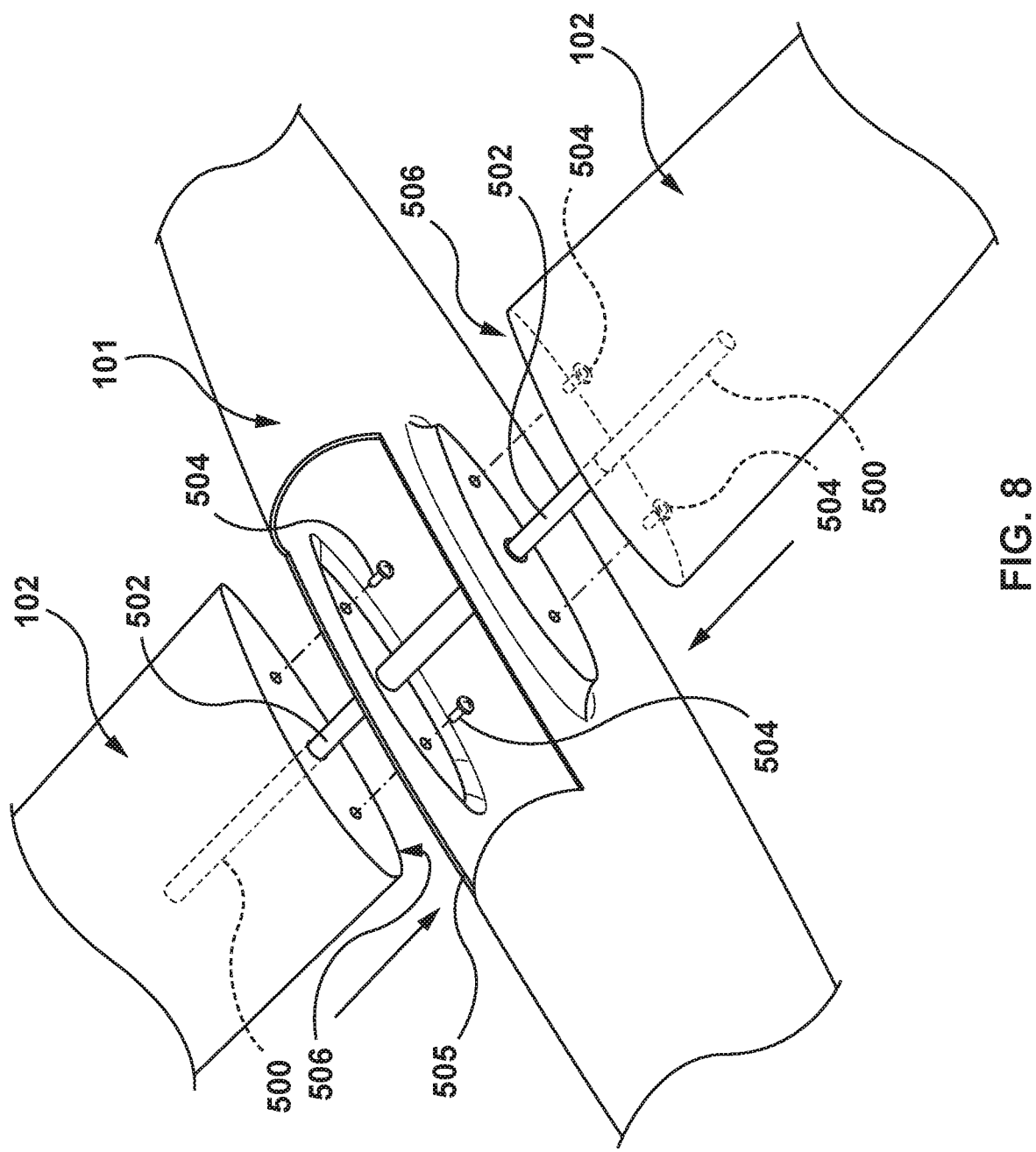

FIG. 8 depicts a partially exploded section view providing a further view of the connection between the molded contour of the fuselage and the wings.

FIGS. 9A and 9B depict different wing shapes, including a long slender design (FIG. 9A) and a short high cambered design labelled as (FIG. 9B).

FIGS. 10A and 10B depict cross-sectional views of two different modular wing designs: a thicker wing airfoil (FIG. 10A) and a slimmer wing airfoil (FIG. 10B) for use with the UAV of FIG. 1.

FIGS. 11A, 11B and 11C illustrate an optional slat installed on the forward edge of the thicker wing airfoil shown in FIG. 10A.

FIG. 11D shows airflow patterns across the surface of a wing without a slat.

FIG. 11E shows the airflow patterns on a wing with an installed slat. Detailed views of the manner of installation of the slat are also provided.

Figure 11F:
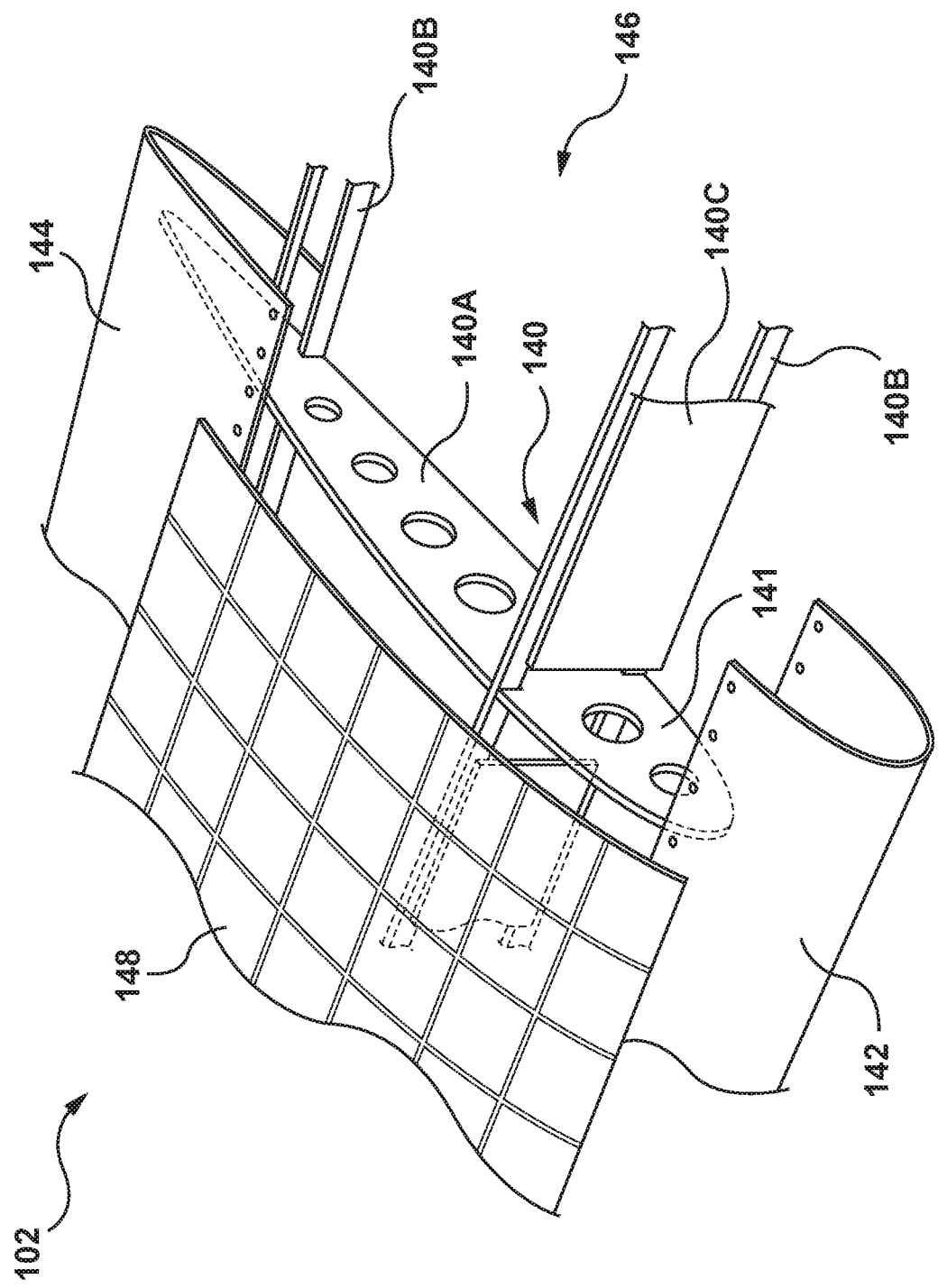

FIGS. 11F and 11G show, respectively, an exploded perspective view and a side cross-sectional view of an illustrative embodiment of a wing incorporating solar panels.

FIGS. 12A and 12B depict a partially exploded view of the tail of the fuselage, including removable fins.

FIG. 13 depicts a perspective view of an illustrative embodiment of a cargo container of the aircraft of FIG. 1.

Figure 14:
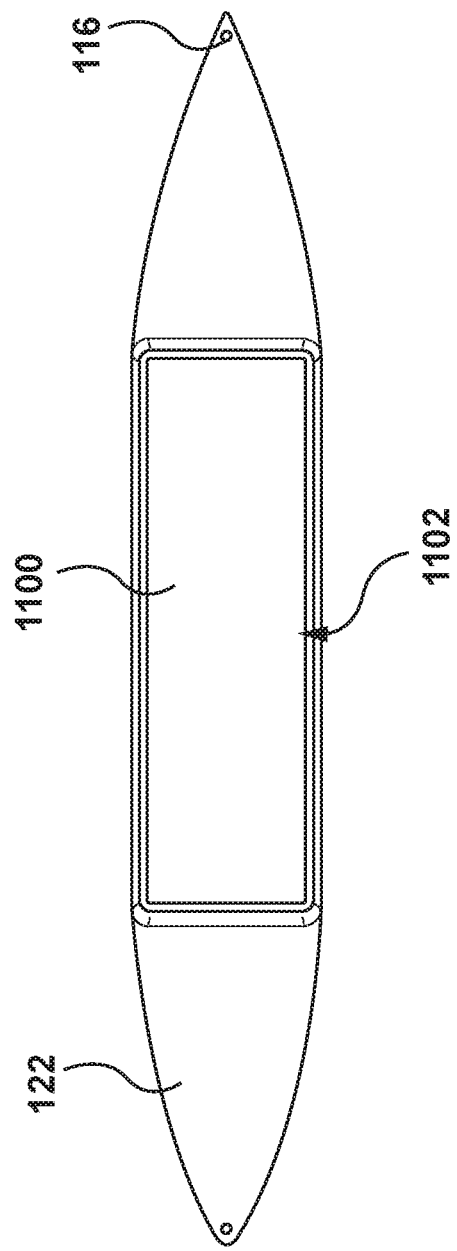

FIG. 14 depicts a top view of the cargo container of FIG. 13.

Figure 15:
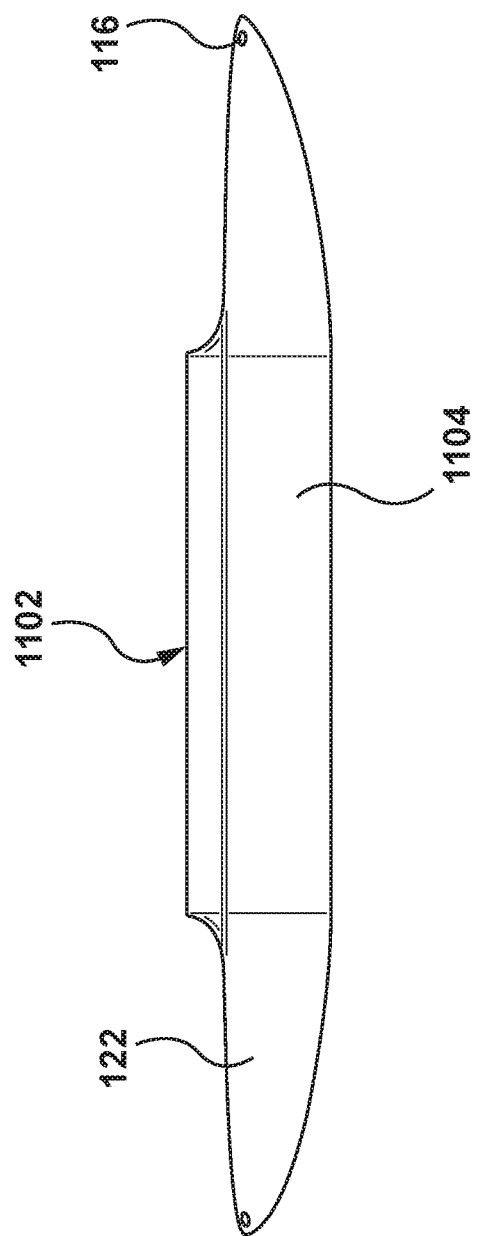

FIG. 15 depicts a side view of the cargo container of FIG. 13.

FIG. 16 depicts a front view of the UAV of FIG. 1 with the wings detached from the fuselage, and a cargo container installed underneath.

FIGS. 16A through 16C show alternate arrangements for a cargo container.

Figure 17:
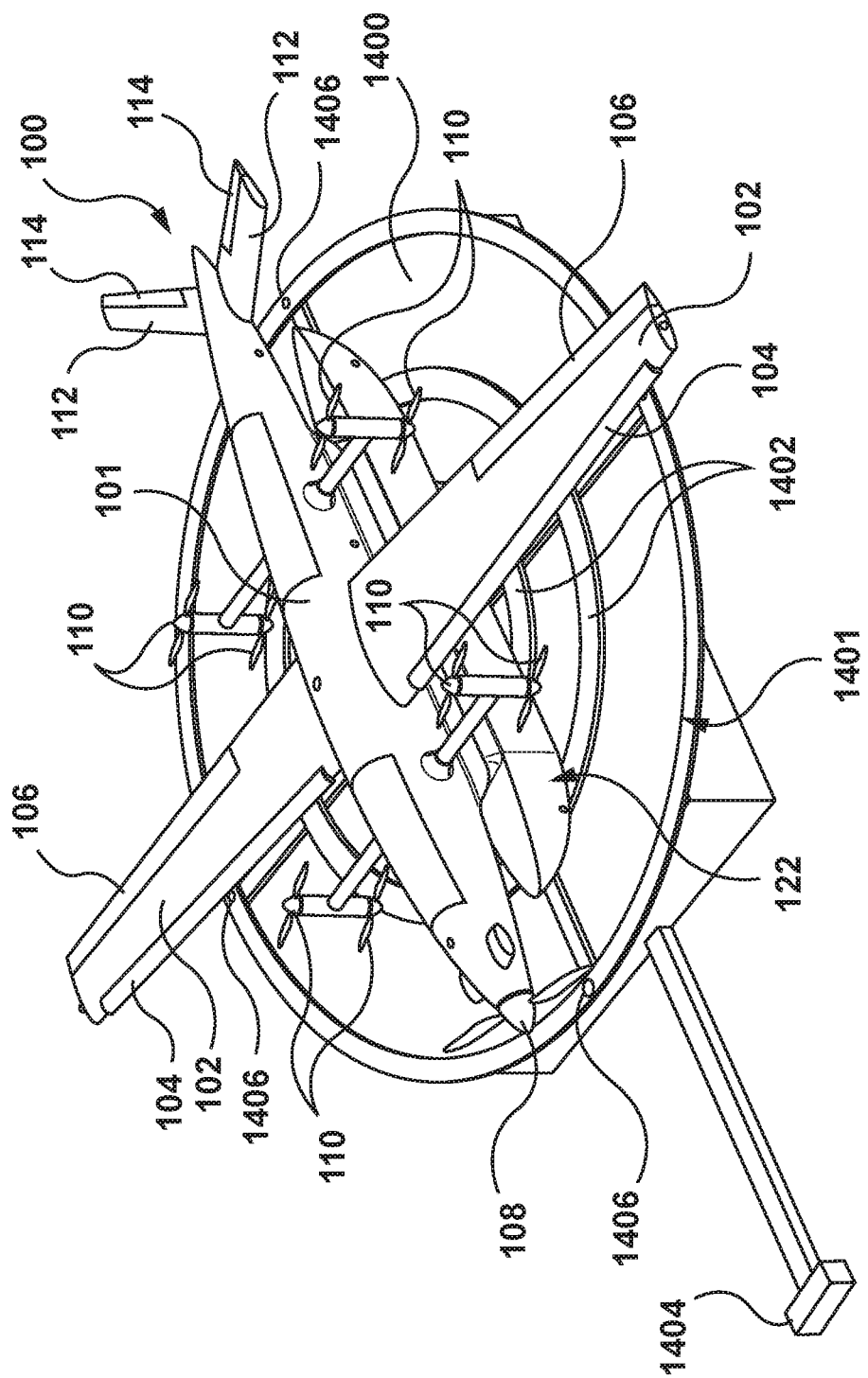

FIG. 17 depicts a perspective view of the UAV (as provided in FIG. 1) positioned on a base terminal station.

Figure 18:
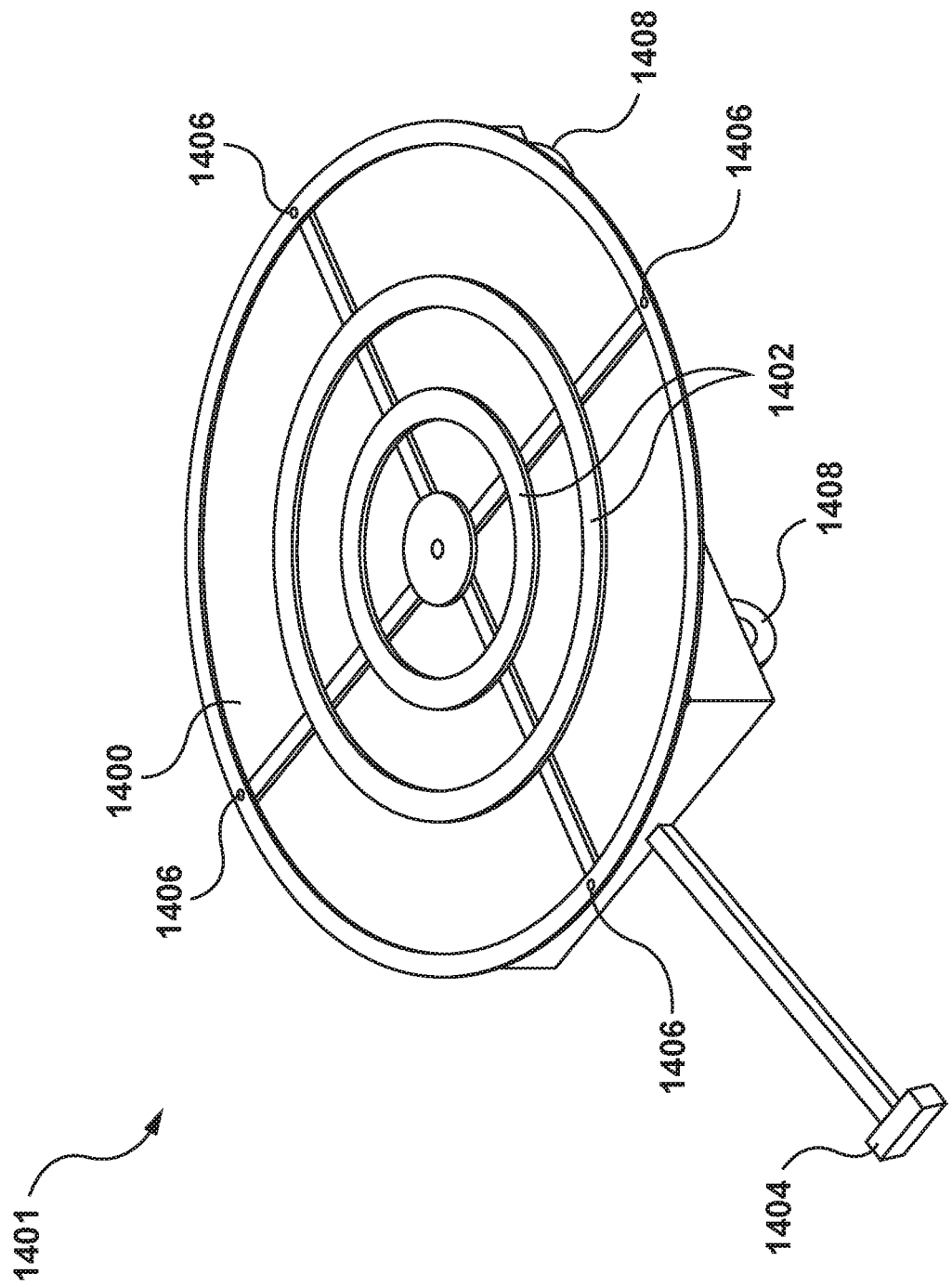

FIG. 18 depicts a perspective view of a sample base terminal station as shown in FIG. 17.

Figure 19:
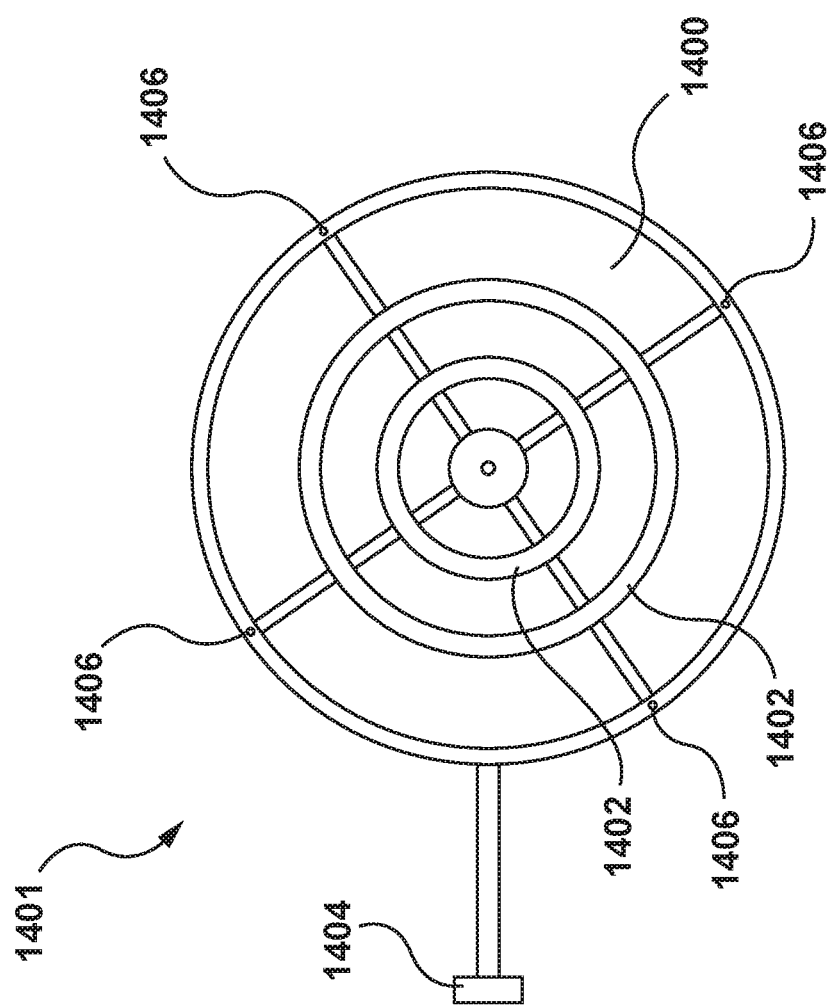

FIG. 19 depicts a top view of the base terminal station of FIG. 18.

Figure 19A:
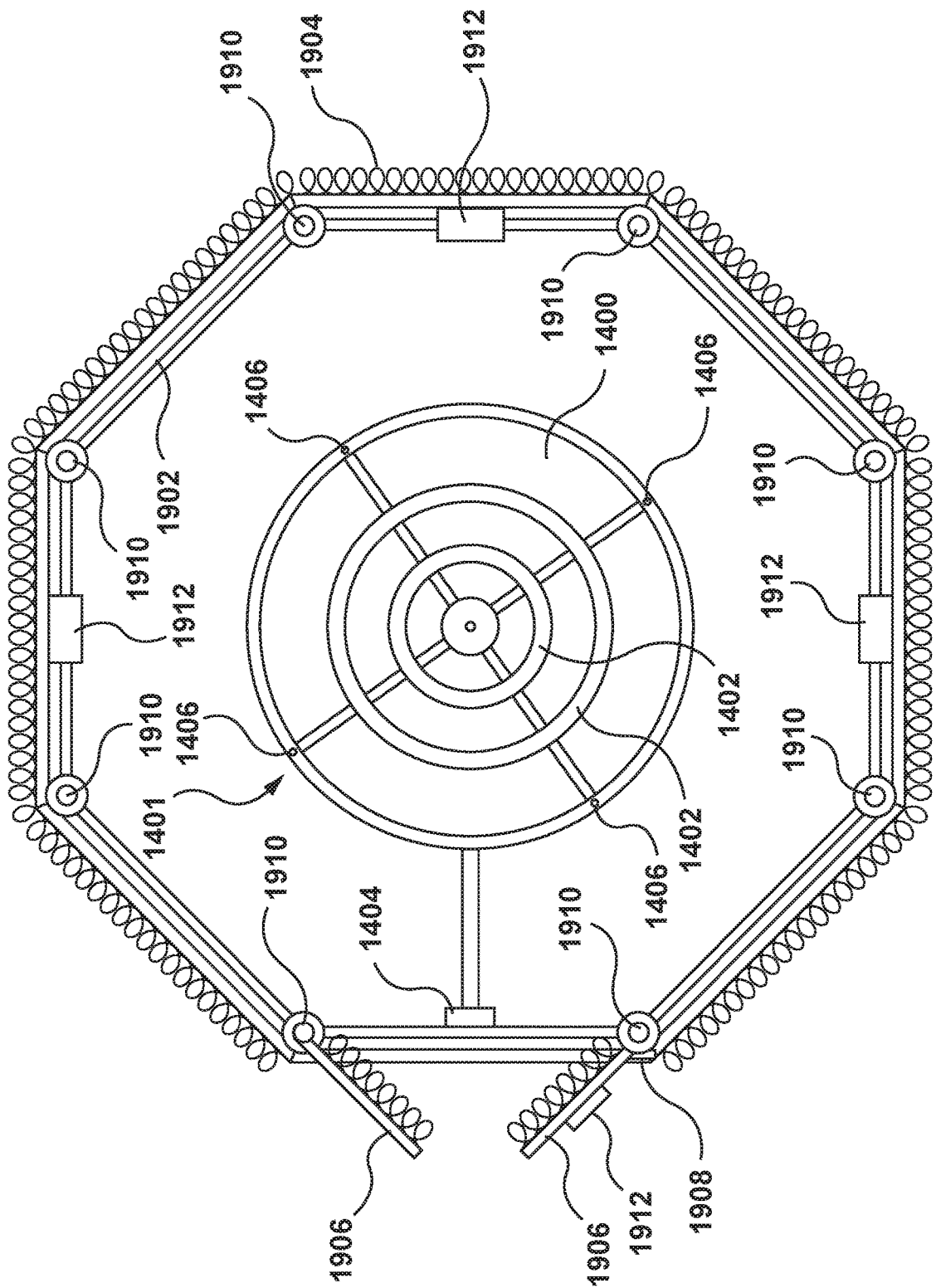
Figure 19B:
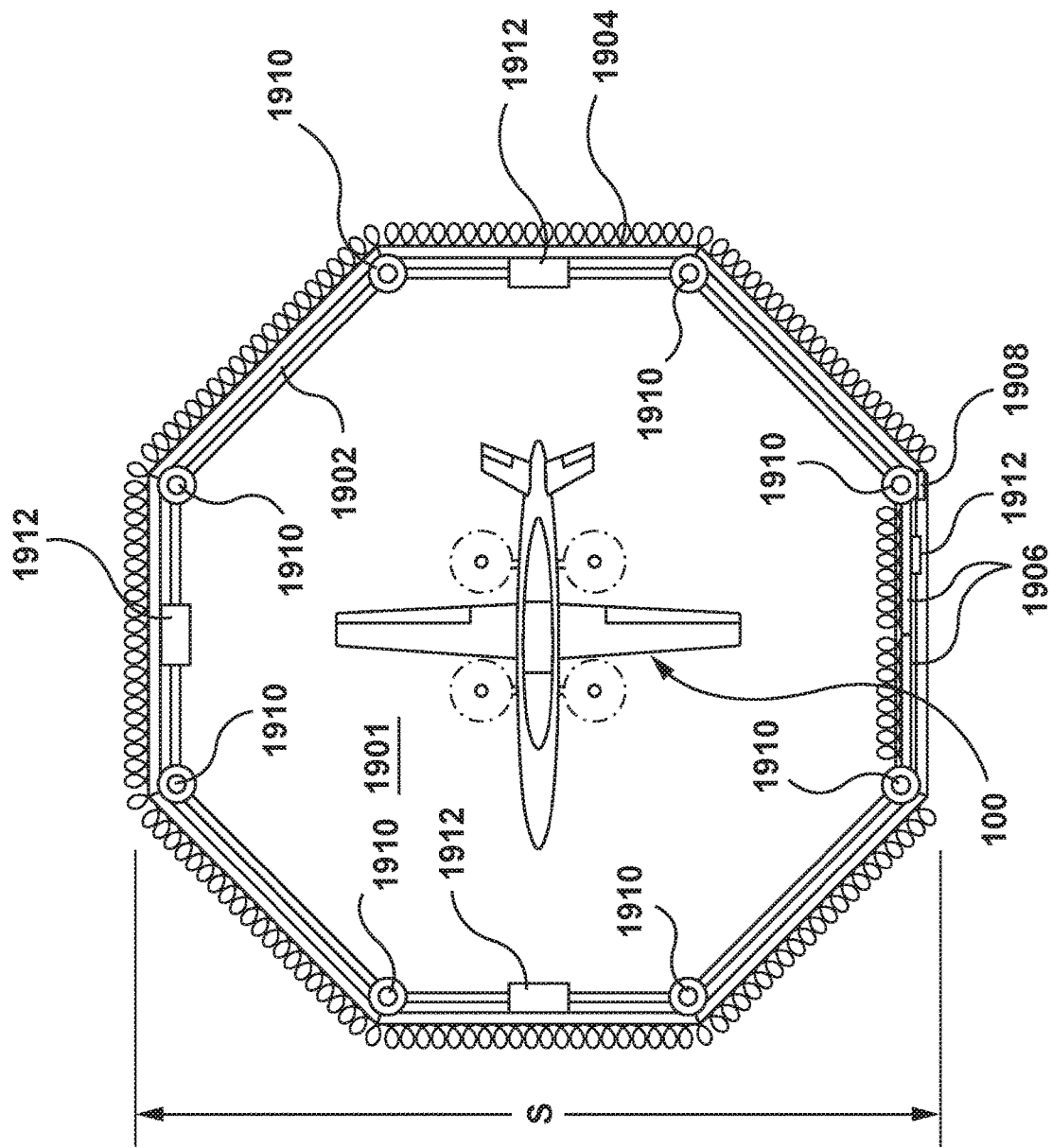

FIGS. 19A and 19B show illustrative plan views of fencing arrangements for base terminal stations.

FIG. 20 is a schematic diagram of a flight control system for a UAV such as that shown in of FIG. 1.

Figure 21:
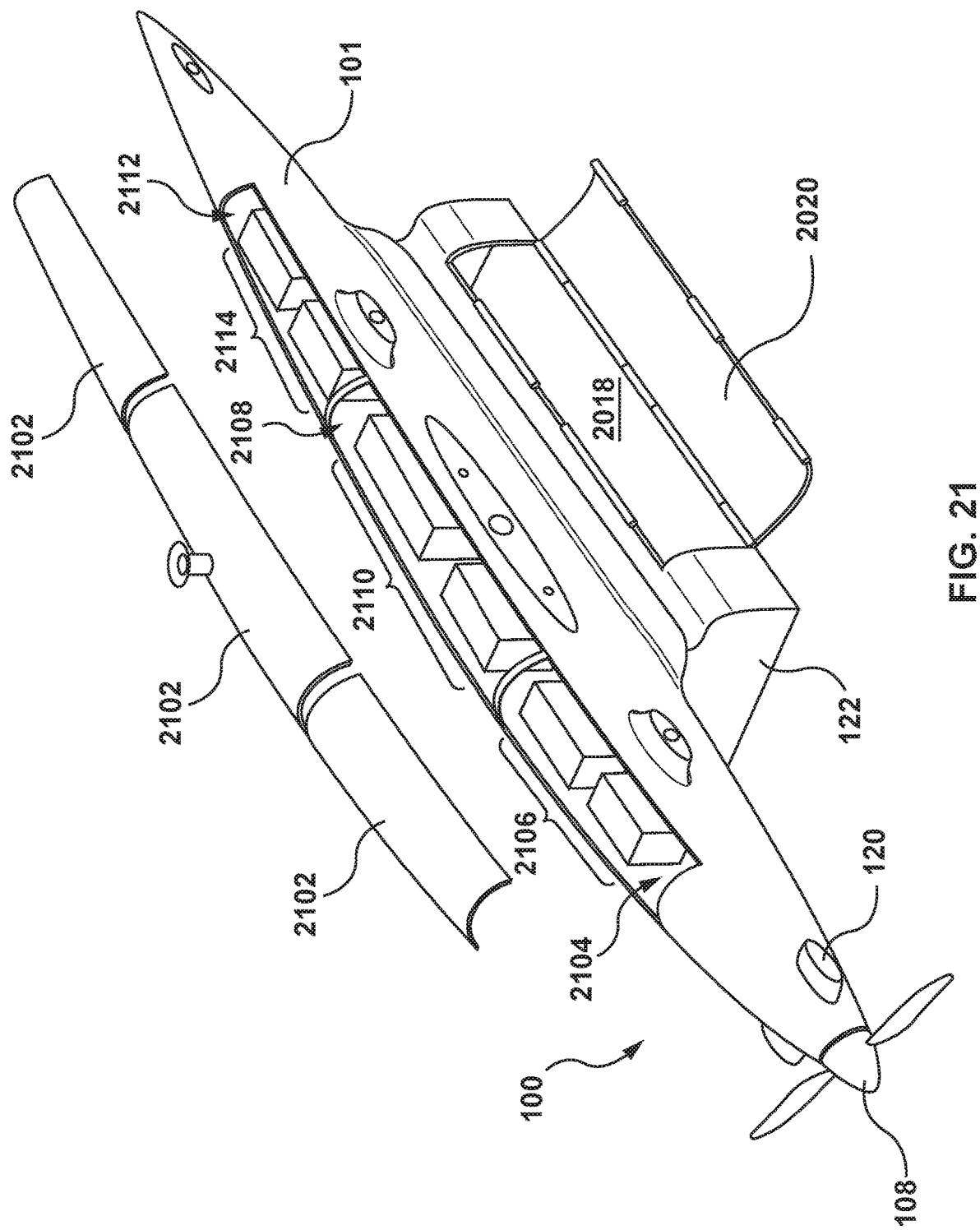

FIG. 21 is a partially exploded view of an illustrative fuselage for a UAV according to the present disclosure.

DETAILED DESCRIPTION

As used herein, the terms "manned" and "unmanned" refer, respectively, to the physical presence or absence of a human pilot aboard the aircraft, and are used for convenience as conventional terms of art and are not intended to specify, require or imply any particular sex/gender of any human pilot. A human pilot can, of course, be of any sex/gender.

Figure 2:
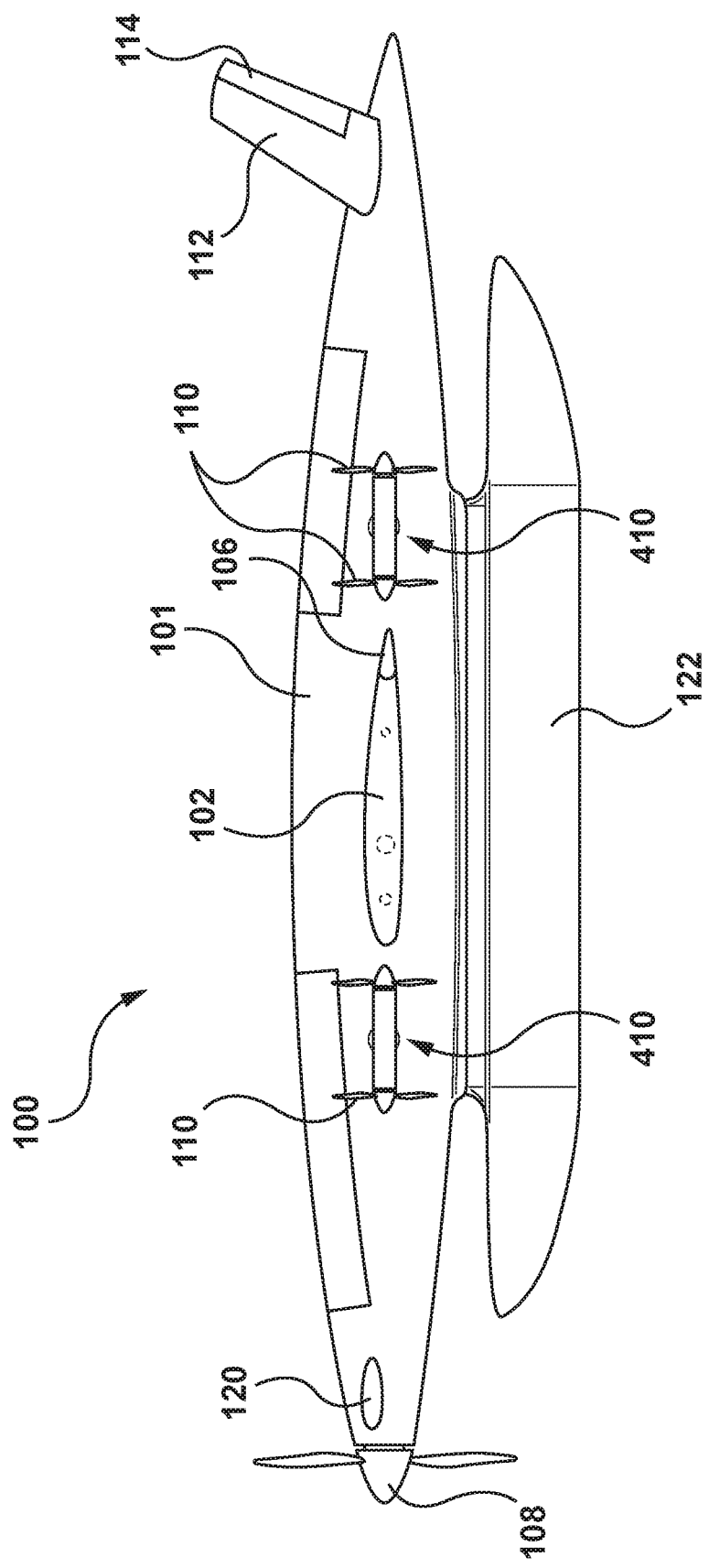
FIG. 2 depicts a side view of the UAV of FIG. 1 in the horizontal/forward flight position.

In one embodiment, as illustrated in FIG. 1, there is provided a cargo-carrying UAV 100 which is adapted for both forward flight as well as VTOL operations. The UAV 100 includes a central body portion referred to as a fuselage 101, a pair of wings 102 extending directly from the fuselage 101, and a pair of tail fins 112 in a V configuration secured to the rear of the fuselage 101. A central processing unit (described further below) is carried by the fuselage 101, preferably housed therein. The depicted UAV 100 has four sets of vectoring rotors 110 (i.e. driven propellers) which provide for lifting power as well as control of stability and pitch of the UAV 100 when in transit, which is a particularly important consideration during takeoff. The vectoring rotors 110 are rotatably carried by the fuselage 101, independently of the wings 102, and configured to be controlled by a central processing unit of the UAV, as described further below. The depicted UAV 100 is adaptable and versatile as it is modular in design, being adaptable to various flight conditions by permitting the removal and replacement of wings and/or tail fins with ideally shaped and sized components for the particular flight conditions and cargo weight at issue. This versatility is the result of the vectoring rotors 110 being mounted on the fuselage 101 rather than on the wings as is the case in conventional aircraft. The wings 102 are modular and removably connected to the fuselage 101 and configured to be interchangeable with an alternate pair of wings. Critically to certain embodiments, the wings 102 are aerodynamic, lift-generating wings. The wings 102 are detachable from the fuselage 101, as will be described in greater detail below, and this feature permits the customization of the UAV 100 to adapt it for different flight conditions. The particular wings 102 shown in FIG. 1 are relatively broad and thick, and would be most useful for short haul flights in which a relatively heavy load is carried. In this case, the depicted wings 102 also include ailerons 106 for providing further control of the aircraft in roll, and slats 104 which serve to provide enhanced lift and control of the aircraft during takeoff and landing. Because the vectoring rotors 110 are rotatably carried by the fuselage 101, independently of the wings 102, removal of the wings 102 from the fuselage 101 leaves the vectoring rotors 110 rotatably carried by the fuselage 101. In addition, by propelling or thrusting the UAV 100 from its fuselage 101 instead of by way of its lightly supported wings 102, heavier cargos may be lifted. A cargo container 122 is detachably secured underneath the fuselage 101. FIG. 2 also shows the embodiment of FIG. 1 in a side view.

The fins 112 may also be optionally removable so that the appropriate set for particular flight conditions may be deployed. Generally, the suitable dimensions of the wings 102 for particular conditions will be reflected in the fins 112. That is, if broad and thick wings 102 are used, the tail fins 112 should be similarly proportioned to be broad and thick. Conversely, if slender wings are used, then the tail fins 112 should also be similarly slender. The particular tail fins 112 shown in FIG. 1 also include an additional elevator 114 which would assist in providing further control over pitch of the UAV 100.

In the depicted UAV 100, there are a total of nine propellers: a nose propeller 108, and four pairs of vectoring rotors 110. Each propeller is driven by an engine or motor. In this embodiment, the nose propeller 108 is principally responsible for maintaining forward thrust of the UAV 100 in horizontal flight, once it is airborne and has achieved sufficient altitude. Accordingly, the engine 105 powering the nose propeller 108 is located proximate to said nose propeller 108, and is not visible in this view. However, a fuel tank 120 for said engine 105 is accommodated by the visible protrusions formed into the shell of the fuselage 101. In terms of the eight vectoring rotors 110, each are attached to ends of a hollow rotor shaft 410, which may be constructed from any lightweight material or composite that is suitable for aircraft parts. The vectoring rotors 110 are carried by the fuselage 101 by way of attachment to the rotor shafts, 410 which are in turn mounted on crossbars 400 secured to the fuselage 101. Thus, the vectoring rotors 110 are carried by the fuselage 101. Contained within the rotor shaft 410 are further motors 406 for vectoring rotors 110; the term "vectoring rotor", as used herein, is to be understood as including the propeller and the motor driving it. There may be one motor 406 per two vectoring rotors 110 for a total of four such motors, or there may be individual motors for each vectoring rotor 110. The motors are connected via crossbar 400 to an energy source contained within the fuselage 101. In the depicted embodiment, the motors for vectoring rotors 110 are preferably fully electric motors which are each connected internally to an onboard electrical system and one or more rechargeable batteries. In contrast, the engine 105 for the nose propeller 108 is preferably a single fixed position motor powered by liquid fuel, such as liquid hydrogen or gasoline. Thus, in this particular embodiment the aircraft 100 is hybrid powered using liquid fuel and electricity. This embodiment of the UAV 100 is configured to use different energy sources because the nose propeller 108 must be robustly powered in flight as it provides most of the forward thrust needed to maintain horizontal flight. Fuel-powered motors currently tend to provide greater and longer-lasting power as compared to electric motors. However, electric motors could be used for all applications in the UAV 100.

In one preferred embodiment, the nose propeller 108 is itself capable of sustaining horizontal flight in cooperation with the wings 102. It is not necessary for the vectoring rotors 110 to be powered after vertical take-off. Alternatively, if appropriately configured, the vectoring rotors 110 can remain active during forward flight or could be used to recharge the battery system during forward flight by using electrical magnetic energy generated by internal stators and commutators.

Generally, the UAV 100 is configured to transition from VTOL operations to horizontal flight by, for example, controlling the vectoring rotors 110 to achieve a desired altitude (via one or more processors, not shown) and then at the appropriate flight altitude, using the nose propeller 108 (and optionally the vectoring rotors 110) to propel UAV 100 in a forward flight motion. The vectoring rotors 110 are preferably rotatably carried by the fuselage 101 so as to be rotatable between a substantially vertical configuration relative to the fuselage 101 and a substantially horizontal configuration relative to the fuselage 101. During take off, the rotor shafts 410 and their internally installed electric motors 406 are in a vertical position so that the attached vectoring rotors 110 provide upward thrust. The fixed forward engine 105 connected to the nose propeller 108 is on an idle throttle setting, so that the motor is running at a relatively low RPM so as to not cause undue forward motion while lifting is being achieved. Once the UAV 100 is at a sufficient altitude, an electrical signal is given to the fixed forward engine 105 to throttle up, so that it generates much higher RPM to start to drive UAV 100 in a forward direction. As this operation is being taken, an electrical signal is sent to the mechanisms attached to crossbars 400 to rotate, which will ultimately result in the vectoring rotors 110 being appropriately positioned to supplement the forces generated by the nose propeller 108 to provide forward flight.

In the depicted embodiment, the eight vectoring rotors 110 are oriented so that they turn in a vertical plane. These vectoring rotors 110 can assist in providing forward thrust to the UAV 100 when it is flying horizontally. As will be better illustrated in connection to FIGS. 6A and 6B, the rotor shafts 410 are fixed around the axis of crossbar 400, and can assume a vertical configuration upon appropriate rotation of crossbar 400 by ninety degrees, which further results in the attached vectoring rotors 110 rotating in the horizontal plane. These orientations and conditions are advantageous particularly during VTOL operations, as the blades of the vectoring rotors 110 will provide the necessary lifting force to render the UAV 100 airborne. Thus, as can be seen in FIG. 6C the vectoring rotors 110 are in a first position during vertical flight and in a second position during horizontal flight and the vectoring rotors 110 transition from the first position to the second position by rotating each rotor shaft 410 along a rotational axis upon receipt of a flight control signal from the central processing unit. Rotation of the rotor shafts 410 by 90 degrees transitions the vectoring rotors 110 between the first position and the second position.

It is not essential to provide for two vectoring rotors 110 per rotor shaft 410. The aircraft will be operable with a single vectoring rotor 110 attached to each rotor shaft 410 for a total of four vectoring rotors 110, but the blades of such a vectoring rotor 110 would need to be significantly larger and broader to provide the necessary surface area required to generate sufficient lifting force during VTOL operations. In contrast, when two vectoring rotors 110 are used per rotor shaft 410 as shown in FIG. 1, the blades of the vectoring rotors 110 may be smaller as the surface areas of both sets of propellers will additively provide sufficient lifting force. It has been found to be more convenient to use a pair of vectoring rotors 110 having smaller blades as they are less obstructive to the attached cargo container 122, and also produce less drag during flight. Moreover, an arrangement in which there are eight vectoring rotors arranged in pairs may provide redundancy and improved safety.

FIGS. 1A and 1B show an alternate embodiment of a UAV 100A. The UAV 100A is similar to the UAV 100 depicted in FIGS. 1 and 2, with like reference numerals denoting like features except with the suffix "A". Thus, the UAV 100A includes a fuselage 101A, wings 102A with slat locations 104A and ailerons 106A, tail fins 112A with elevators 114A, sensors 116A and a detachable cargo container 122A. The UAV 100A depicted in FIGS. 1A and 1B differs from the UAV 100 depicted in FIGS. 1 and 2 primarily in that the UAV 100A depicted in FIGS. 1A and 1B has a single vectoring rotor 110A attached to each rotor shaft 410A for a total of four vectoring rotors 110A instead of eight, and omits any nose propeller and related components, with forward thrust being provided entirely by the four vectoring rotors 110A. The UAV 100A depicted in FIGS. 1A and 1B also includes a landing skid 124A.

Other variations in the number and size of propellers are also possible. For instance, the UAV could be outfitted with a total of three rotor shafts with vectoring rotors, two being connected by a crossbar traversing the fuselage in front of the center of gravity (at attachment point for the wings) of the fuselage, and one being directly attached to the top of the fuselage behind the wings. In this configuration the single propeller behind the wings would need to have larger blades than those vectoring rotors used in the front structure, in order to provide equivalent lifting force to the forward vectoring rotors such that the UAV can still maintain VTOL operations without pitch becoming a problem. Many such variations would be possible within the scope of the claims.

Alternate configurations for the wings 102 and vectoring rotors 110 would operate similarly, and would be within the purview of a person skilled in the art. For instance, the UAV 100 could be equipped with more than one pair of wings 102. The UAV 100 could have further sets of crossbars 400 equipped with vectoring rotors 110. For reasons that will be further explained below, as long as the crossbars 400 and vectoring rotors 110 are located both fore and aft of the wings 102 which correspond to the location for the centre of gravity for UAV 100, and a sufficient distance from wings 102 such that the vectoring rotors 110 form the vertices of a rectangle when viewed from above, they will serve to provide stability and pitch control to the UAV 100. Thus, the vectoring rotors 110 are configured around the center of gravity of the aircraft 100.

The UAV 100 may be built in a variety of dimensions and configurations. A sample UAV 100 may have a 5.4 m wingspan, a length of 2.6 m, and a height of 1.2 m. When so dimensioned, its weight would be in the range of 200 kg, and the maximum cargo load would be approximately 100 kg. It could be powered with a 300 cc gas twin cylinder engine for the nose propeller 108, and a set of 20 kW electric AC motors for the vectoring rotors 110. With these dimensions and components, the maximum distance range would be expected to be 500 km, with a cruising speed of 100 km/h, a maximum speed of 140 km/hour, and maximum endurance of 5.2 hours. However, smaller or larger UAVs may be readily constructed in accordance with the disclosure, and with differing dimensions and limitations.

A series of electronic and digital gyroscopic sensors 118 and proximity sensors 116 may be positioned at locations such as the surface of the fuselage 101 or the cargo container 122 to detect changes in flight characteristics and parameters. Several examples of suitable locations can be seen in FIG. 1, with sample sensors indicated as parts 118 and 116. Gyroscopic sensors 118 contain microscopic crystal structures mounted on small plates which receive movement and stress signals when the aircraft moves. Proximity sensors 116 may use radar and infrared signals to provide positional information of the aircraft and also detect objects that may be in the flight path of the aircraft such as trees, wires, poles, buildings, or birds. Proximity sensors 116 may also be used to detect if an individual approaching the aircraft is authorized to do so by using a reference image similar to those used in existing security protocols found on devices such as cell phones and gated entrances. Other additional features may include 360 degree digital cameras mounted along the outer surfaces of the fuselage 101, or programmable recognition software that integrates eye scan and fingerprint technology. In one example, if unauthorized personnel is detected, the aircraft may switch to a lockdown mode thereby rendering the UAV 100 inoperable until security clearance is provided, and preventing the removal of storage media (e.g. a computer memory storage device such as an SD card). Similarly, the presence of an unauthorized person can also cause the cargo container 122 to be similarly locked down and its contents rendered inaccessible. Such security features improve the safety of the UAV 100 and its cargo.

Once a gyroscopic sensor 118 or proximity sensor 116 detects a change in the flight characteristic or other relevant parameter, the change is measured using an inertial measuring unit (IMU) and may be transmitted as an electrical signal to a CPU of the UAV 100 where it is processed. Upon receipt of an electrical signal from the CPU, mechanical actuators may further direct the movement of various flight control surfaces on the aircraft such as ailerons 106 and elevators 114, as well as other components such as the crossbars 400 connected to the rotor shafts 410 and the vectoring rotors 110. Electrical signals may also be transmitted to speed controllers which control the speed of the vectoring rotors 110 and the nose propeller 108. By appropriately responding to the various flight conditions detected by the sensors 116 and 118, the flight control system facilitates the UAV 100 in operating smoothly, safely and in control.

The navigation of the UAV 100 may be supported using two different navigational systems. The first is the Global Positioning System (GPS). Since GPS may not be reliable under inclement weather conditions or in remote regions, the aircraft is also supported by a second navigational system which relies on vectored flight positioning. Specifically, this second navigational system uses a series of algorithms similar to flight navigation performed prior to GPS (e.g. dead reckoning). Computer calculations are performed with respect to the distance, speed and relative position between UAV 100 and the destination using longitude and latitude coordinates. In autopilot mode, information from both navigational systems are transmitted to the flight control system and relayed to servos (not shown) which are connected to flight control surfaces and other movable components. The UAV 100 can be programmed to fly from any location and return to the same location without any human intervention making the UAV 100 fully autonomous. The UAV 100 may also be navigated in real-time by a pilot seated in a remote location using visual monitors and hand operated (e.g. joystick) actuators that control the flight control system.

Data from the traffic collision avoidance system (TCAS) and the automated weather advisory station (AWAS) may be integrated directly into the flight control system of the UAV 100. In doing so, the UAV 100 may be directed along a flight path that is optimized for the least air traffic and/or the most favourable weather conditions. The TCAS and AWAS systems do much of this work by using forward scanning radar to locate potential danger by using special software that is embedded into these systems.

As the UAV 100 flies, it constantly receives data via radio contact. As the conditions change (e.g. data from the TCAS and AWAS) and/or information is received from sensors (e.g. gyroscopic sensors 118 and proximity sensors 116) on the UAV 100, data signals are sent as electrical pulses to the on-board processor(s) (i.e. CPU) executing the autopilot to make physical changes by sending control signals as electrical pulses to the servos which in turn move flight surfaces such as rudders, elevators and ailerons, as well as the angle and rotational speed of the vectoring rotors 110. One illustrative risk scenario is a determination by the TCAS that if the UAV 100 were to continue on its current course, it would make contact with another aircraft. Data signals sent to the on-board processor(s) would result in execution of a course correction by sending control signals to the flight controls at a predetermined rate based on the speed and GPS location.

Communication with the UAV 100 may be mediated by using a discrete radio frequency that is registered and secured with the appropriate regulatory body, such as the Federal Communications Commission (FCC). Unlike most existing unmanned aircraft which use an open source low powered ¼ watt, 2.4 GHz hobby type radio frequency, the aircraft disclosed herein may use both band spectrum and channel hopping that cannot be publicly accessed or cause interference. The secured communication with the UAV 100 protects it from being tampered with or taken over, unlike traditional unmanned aircrafts which are vulnerable to such interference. Further, since the radio frequency used by the UAV 100 is licensed, the communication signal has the potential of being more powerful thus allowing greater wireless transfer of data. In some embodiments, the communication signals may be encrypted.

In FIGS. 3A, 3B, 4A and 4B, there are provided some illustrations of the advantages of the rectangular configuration for the vectoring rotors 110. FIGS. 3A and 3B demonstrate a typical configuration of the prior art, with wing propellers 310 and their respective engines/motors 306 carried on the wings 302 of an aircraft 300, in addition to a nose propeller 308. The wings 302 are configured to rotate relative to the fuselage 301 which, because the propellers 310 and their respective engines/motors 306 are carried on the wings 302, has the effect of rotating the propellers 310 and their respective engines/motors 306 relative to the fuselage 301. Particularly during take-off conditions, there can be significant issues with the tilting of the aircraft 300 around its centre of gravity as shown in FIG. 3B. This problem with pitch results mainly from the wing propellers 310 having no opposing forces.

FIG. 4A demonstrates the same problem with pitch that is seen in an aircraft configuration of the prior art, as discussed in relation to FIG. 3B, reproduced for comparison with FIG. 4B. FIG. 4B schematically shows the configuration of an illustrative UAV 100A according to the present disclosure. It can be seen that the vectoring rotors 110A are placed on both sides of the UAV 100A, both fore and aft of the centre of gravity which corresponds to the area of the fuselage 101A at which the wings 102A are installed. The rear vectoring rotors 110A will assist in balancing forces from the forward vectoring rotors 110A, reducing or eliminating the undesired issues with pitch and resulting in a more stable flight path. The superiority of the disclosed rectangular configuration for vectoring rotors (propellers) is thus evident.

FIG. 5 shows a partially exploded perspective view of UAV 100, with the wings 102 separated from fuselage 101. Also shown in FIG. 5 are the vectoring rotors 110 in horizontal orientation, which are thereby suited for conditions of take-off and landing. In this embodiment, each crossbar 400 is shown as two separate bars that may be installed into the wall of the fuselage and connected interiorly. Crossbars 400 can be readily made as a single bar configured to span the width of the fuselage 101 or as separate bars which can be securely connected at their meeting point internal to the fuselage 101. Either embodiment would work well, but for ease of assembly, it may be more convenient to have two separate bars to make up the unified crossbar 400. Separate bars can also be used to facilitate individual control of the angle of each vectoring rotor 110 relative to the fuselage 101.

FIGS. 6A and 6B show the crossbar 400 and vectoring rotors 110 in further detail, isolated from the UAV 100, with FIG. 6A showing the vectoring rotors 110 in appropriate orientation for VTOL operations and FIG. 6B showing the vectoring rotors 110 in appropriate orientation for forward flight conditions. The ends of crossbar 400 are immovably fixed to rotor shafts 410. The orientation of the rotor shafts 410, and therefore of their attached vectoring rotors 110, results in differing flight patterns for UAV 100. It can be seen here that the crossbar 400 is coupled to a turret drive mechanism 412 which facilitates rotation of the crossbar 400, which ultimately results in rotation of the attached rotor shafts 410 and vectoring rotors 110. Thus, rotation of the rotor shafts 410 is driven by a turret drive. The activation of turret drive mechanism 412 may be controlled by the aforementioned processors in the controller for the UAV 100 or its CPU 2002 (see FIG. 20).

The transition between the vertical position and the horizontal position, and vice versa, requires a rotation of 90 degrees along the rotational axis which is facilitated by the turret drive mechanism 412. In operation, upon receipt of a flight control signal from the CPU, located for example within the fuselage 101 of the UAV 100 to rotate the vectoring rotors 110, a motor 402 drives a belt 403 or similar connecting device coupled to a gear 404 that rotates the crossbar 400 which in turn rotates the vectoring rotors 110 that are affixed to the ends of the rotor shafts 410. The turret drive mechanism 412 thereby provides for a smooth transition between horizontal and vertical flight. For angled flight of the aircraft, the turret drive mechanism 412 may rotate the vectoring rotors 110 to an intermediate position between the horizontal position and the vertical position; rotation of the rotor shafts 410 by less than 90 degrees causes the vectoring rotors 110 to take on an intermediate position between the first position and the second position (see FIG. 1B). Preferably, the rotor shafts 410 are arranged in pairs (e.g. a forward pair and an aft pair) and each pair of rotor shafts 410 rotates independently. Referring again to FIGS. 1A and 1B, in preferred embodiments the forward vectoring rotors 110 can be moved between a horizontal position and a vertical position independently of movement of the rearward vectoring rotors 110 between a horizontal position and a vertical position, to facilitate a smooth, controllable transition from vertical flight to forward horizontal flight; this process is referred to as sequential vectoring thrust. Sequential vectoring thrust can be applied both in the presence and absence of a nose propeller. Optionally, each of the vectoring rotors 110 may be controllable independently of each other to provide lateral and yaw stability during low speed maneuvering.

FIG. 6C is a perspective view of the UAV 100A shown in FIG. 1A with the cover removed, which shows an alternative arrangement for a turret drive mechanism 412A. The CPU 2002 that executes the autopilot module 2004 (FIG. 20) is coupled to a vector drive controller 602 which controls fore and aft motors 604 whose shafts 606 rotate the respective crossbars 400A via mechanical couplings 608 to thereby rotate the vectoring rotors 110A that are affixed to the ends of the rotor shafts 410A.

FIGS. 7-11 show further details of the wings 102 and how they may be releasably secured to both sides of the fuselage 101 using a wing tube assembly system (elements 500, 502 and mechanical fasteners 504 shown in FIGS. 7-9B). In one embodiment, shown in FIG. 7, the first pair of wings 102 is secured to the fuselage 101 by inserting wing support tubes 502 extending from the root ends of the first pair of wings 102 into one or more wing tube sleeves 500 mounted in the fuselage 101. In this embodiment, the fuselage 101 is mounted with a wing tube sleeve 500 that traverses the width of the fuselage 101 and is sized to accept from both ends a wing support tube 502 extending from a root end of the left and right wings 102. In another embodiment, shown in FIG. 8, the first pair of wings 102 is secured to the fuselage 101 by inserting wing support tubes 502 extending from the fuselage 101 into wing tube sleeves 500 in the root ends 506 of the first pair of wings 102. The wing support tubes 502 (which may be two ends of a single monolithic tube) are secured to the fuselage 101 and extend outwards on both sides (e.g. away from one another) and into the wing tube sleeve 500 within the root end of each wing 102. In both embodiments, the insertion of the wing support tube 502 into the tube sleeve 500 secures the wing to the fuselage 101 and supports the weight and forces of the UAV 100.

The components of the wing tube system 500 and 502 may be made of carbon fibre or similar material to provide superior strength while remaining lightweight. The wings 102 are further secured to the fuselage 101 by moulding the shape of the root end 506 of the wing 102, thereby providing improved aerodynamics to the UAV 100. The wings 102 and fuselage 101 are further secured by using mechanical fasteners 504 such as nuts and bolts or T-nut fasteners. Access to the fasteners 504 that secure the wings to the fuselage 101 is provided by way of an access hatch 505 which may be positioned in the fuselage 101 along the top surface, proximate to where the wings 102 meet the fuselage 101. The wing support tubes 502 provide the principal support whereas the fasteners 504 further secure the wings 102 to the fuselage so they do not disconnect from the fuselage 101 during flight.

The wing tube system 500 and 502 and mechanical fasteners 504 used to secure the wings 102 to the fuselage 101 also allow the wings 102 to be easily detached and replaced with alternate wing designs or for example, for repair of a wing. Thus, one or more alternate pairs of wings may be configured to be secured to the fuselage 101 at the same position as the first pair of wings. Unlike in existing designs, since the vectoring rotors 110 are not secured to the wings 102 of the aircraft, the wings 102 can be readily switched out as they are unencumbered. Modular in design, the fuselage 101 is adapted to accept different airfoil shapes of wings for different types of flight dynamics, as shown in FIGS. 9A, 9B, 10A and 10B. FIG. 9A shows a wing 102 with no forward slat, and FIG. 9B shows a wing with a forward slat 104. For example, long slender wings 102 as used in gliders can be used to produce faster flight over longer distances while shorter high cambered wings 102 can be used for slower and heavier lift operations. FIG. 10A shows the profile of a shorter high cambered wing 102 and FIG. 10B shows the profile of a long slender wing 102. Thus, the first pair of wings 102 and the alternate pair(s) of wings 102 may have different aerodynamic configurations.

To optimize the wings 102 for even slower flight speeds, shorter, broader wings 102 with wing slats 104 installed on the leading edge may be used, as seen in FIGS. 9B and 11A. FIGS. 11A and 11B show detailed views of the leading edge of a shorter, high cambered wing 102 with an installed wing slat 104; FIG. 11C shows a profile of the entire wing 102 with the slat 104. FIGS. 11D and 11E show the difference in surface air flow patterns on a wing 102 without a wing slat 104 (FIG. 11D) versus a wing 102 with a wing slat 104 (FIG. 11E). The wing slat 104 may be fastened to the wing 102 by use of appropriate fasteners.

Other wing configurations are also possible. For example, if it is desired to adapt the UAV 100 for water landing, the wings 102 provided may have pontoons.

FIGS. 11F and 11G show one illustrative embodiment in which the wings 102 incorporate solar panels, for example to supply power to batteries that drive the vectoring rotors 110. In the embodiment shown in FIGS. 11F and 11G, the wing 102 comprises an internal frame 140 formed from a lightweight material such as aluminum or another suitable material using a spar "box" construction comprising wing ribs 140A having a forward D cell 141, spars 140B and spar webs 140C. Sheeting formed from aluminum or another suitable material is carried by the internal frame 140 to form a leading edge 142 and a trailing edge 144 of the wing 102, with a gap 146 between the leading edge 142 and the trailing edge 144. Solar panel material 148 is adhered by a suitable adhesive 150 (e.g. adhesive tape offered under the trademark VHB™ by 3M, having an address at 3M Center, St. Paul, Minn. 55144-1000) to the leading edge 142 and the trailing edge 144 to bridge the gap 146 and complete the aerodynamic profile of the upper surface of the wing 102. A lower covering 152 (FIG. 11G) is similarly adhered to the complete the aerodynamic profile of the lower surface of the wing 102.

Similarly to the wings 102, in the illustrated embodiment the tail fins 112 are modular and interchangeable with alternate tail fins 112. The alternate tail fins 112 are configured to be secured to the fuselage 101 at the same position as the first tail fins 112, and the first tail fins 112 and the alternate tail fins 112 may have different aerodynamic configurations.

FIGS. 12A and 12B shows how tail fins 112 may be secured to the rear of the fuselage 101 using a similar tube system and mechanical fasteners as previously shown for the wings 102. In a preferred embodiment, the tail fins 112 are releasably attached, such that the tail fins 112 can be removed and replaced with alternate tail fins 112 depending upon the nature of the flight conditions. In one embodiment, as shown, supporting tail tubes 1002 are secured to the rear of the fuselage 101 and extend into tail tube sleeves 1000 that are mounted in the root ends 1006 of left and right tail fins 112. In another embodiment, the rear of the fuselage has a pair of tail tube sleeves which are sized to accept supporting tail tubes extending from the root ends of the tail fins. The components of the tail tube system 1000 and 1002 may be constructed of carbon fibre or similar material with the tail fins 112 further secured onto the fuselage 101 by moulding the shape of the root end of the fins 112 to complement the fuselage 101 and using mechanical fasteners 504, such as "T" nut fasteners. In a preferred embodiment, the tail fins 112 are assembled onto the fuselage 101 in a "V" shaped configuration, but other configurations are known in the art.

FIGS. 13-16 show various views of a first illustrative embodiment of a cargo container 122 for use with the UAV 100. The cargo container 122 has a cargo compartment 1100, opening 1102, and exterior surface 1104, and is generally held underneath the fuselage 101. The cargo container 122 may be secured to the underside of the fuselage 101 through a system of mechanical latches 1700 (FIG. 16) and may further be used with a latchable lid (not shown) which provides for a waterproof seal. Thus, the cargo container 122 may be sealed. Alternatively, to prevent water from entering the cargo compartment 1100 during flight, the opening 1102 may have edges that extend upwards and fit into a mould casted on the underside of the UAV 100. Such a design of securing the cargo container 122 to the underside of the fuselage 101 would also have the effect of lowering the center of gravity of the UAV 100 thereby increasing its stability. By virtue of this design, the cargo container 122 could also serve as a structure to contact the ground or landing area upon landing of the UAV 100. This aspect is best seen in FIG. 16 where the cargo container 122 is shown attached to the fuselage 101 from a front view.

The cargo container 122 is preferably made of a composite material, and is also preferably a single piece moulded design. In one embodiment, the cargo container 122 is naviform, similar to a canoe shape, having an elongated side profile that is tapered in the front and rear. This streamlined design of the cargo container 122 allows it to be more aerodynamic thereby helping to reduce energy consumption of the UAV 100.

In the depicted embodiment, the cargo container 122 can be separated from the fuselage 101 by unlatching mechanical latches 1700. Once separated, a large opening into the cargo compartment 1100 is made accessible for the loading and unloading of cargos. Other embodiments are possible. For instance, cargo container 122 may be outfitted with side doors. Depending on the cargo being transported, the cargo container 122 may be detached and exchanged for a different cargo design. For example, a larger cargo container may be desirable for a light but bulky freight whereas a smaller cargo container may be desirable for a small dense cargo.

The cargo container 122 may be loaded by personnel, for example a designated person known as the load master, who is responsible to distribute the cargo evenly throughout the cargo container 122 in much the same way as is done with larger transport aircraft. Once the appropriate goods are loaded, the UAV 100 may be deployed to a prepared terminal destination, then unloaded at the destination and sent back, either empty or loaded with return goods. This process may be repeated on a regular basis as a terminal-to-terminal operation.

As mentioned previously, the cargo container 122 may also be outfitted with proximity sensors 116, similar to those installed on the fuselage 101. Data from the proximity sensors 116 on the cargo container 122 may also be used to authenticate identity of approaching personnel or for location sensing, as was described previously. The cargo container 122 may also have additional sensors, such as weight sensors, and may be electrically connected to the circuitry of the UAV 100, so that data received from or in relation to cargo container 122 may be factored into instructions sent to the UAV 100 via its CPU or from a remote controller. For example, conventional load sensors such as load cells may be mounted to the landing gear in order to determine the weight of the cargo. A load cell is a type of force gauge, comprising a transducer that generates an electrical signal whose magnitude is directly proportional to the force being measured. Examples of load cell types include hydraulic, pneumatic, and strain gauge.

The first cargo container 122 is modular and interchangeable with one or more alternate cargo container(s), which is preferably configured to be secured to the fuselage 101 at the same position as the first cargo container 122. The first cargo container 122 and the alternate cargo container(s) may have different designs.

FIGS. 16A through 16C show illustrative alternate arrangements for a cargo container. FIG. 16A shows a cargo container 1622A comprising a hollow, rigid, open topped body 1602A defining an interior volume 1604A and a watertight cover 1606A which cooperates with the body 1602A to seal the cargo container 1622A FIG. 16B shows a cargo container 1622B comprising a tubular frame 1608B and a textile, fabric or plastic cover 1610A. FIG. 16C shows an embodiment in which a cargo container 1622C takes the form of a frame for slung loads.

FIGS. 17-19 depict a UAV system which includes UAV 100 and a base terminal station 1401. The base terminal station 1401 has a surface area that serves as a landing pad 1400 for the aircraft. In this embodiment, a series of metallic conducting rings 1402 are mounted on the top surface of the landing pad 1400. The metallic rings 1402 provide for electrical coupling of the UAV 100, substantially independently of its final landing orientation so that the UAV 100 will make electrical contact with the metallic rings 1402 as long as it lands within the landing pad 1400. A GPS locator may be disposed at the center of the metallic rings 1402 so that the UAV 100 will always track to this location during landing. Designs other than a series of ring formations may be contemplated such as a grid. Upon landing of UAV 100 on the landing pad 1400, the metallic rings 1402 may make contact with a series of metallic conductors 1702 (FIG. 16) on the underside of the cargo container 122 (shown in FIG. 16). The weight of the UAV 100 and the arrangement of the metallic rings 1402 and conductors 1702 ensure that a low voltage connection is made between UAV 100 and attached cargo container 122 and the base terminal station 1401. The contact between the metallic rings 1402 and the metallic conductors 1702 facilitates the automatic recharging of the battery system of UAV 100, obviating the need for a technician and enabling fully autonomous operations between terminals. In this embodiment, base terminal station 1401 would further require a supplemental power source for providing charge to the battery. This could be provided via a variety of sources such as solar power, electrical grid, or supplemental batteries connected to base terminal station 1401. Alternatives to direct electrical contact, for example induction charging, or manual connection by a technician, are also contemplated.

The base terminal station 1401 may also serve as a re-fueling depot, at which the UAV 100 is placed so that a supply of liquid fuel to the liquid fuel tank 120 of the aircraft may be provided. While automated refueling is contemplated, in one embodiment a technician will be present to carry out refueling along with other duties such as exchanging physical storage (e.g. a computer memory storage device such as an SD card) and loading and unloading cargo. For particularly remote destinations, multiple terminal stations may be located along the determined flight route in order to repower the aircraft for segmented flights. The ability to recharge and refuel the aircraft along a long distance flight path would make it unnecessary for the aircraft to have a large battery system or fuel tank. As such, the aircraft's battery system may be reduced in size and weight thereby allowing the aircraft to carry a heavier cargo load. Thus, in one embodiment, the UAV 100 may operate only from terminal to terminal, so as to support the safety of the aircraft and any associated personnel. Warnings and safety placards, lights and the like may be associated with the terminals.

The base terminal station 1401 may include one or more processors and a memory, having software instructions thereon including machine learning algorithms such as artificial intelligence (AI) components. Once data from the aircraft is downloaded onto the base terminal station 1401, the software, once executed, may process the data and confirm that all systems are fully operational and that the UAV is safe to operate. Using preprogrammed circuitry, a series of safety checks may be performed on UAV 100 either wirelessly via the base terminal station 1401 or by wired connection. This eliminates or reduces the need for service technicians to inspect the aircraft before each flight. If an operational system fails a safety check, the information may be relayed to a service technician and UAV 100 removed from operation. The ability to autonomously diagnose UAV 100 using the base terminal station 1401 provides added safety and convenient to its operation. Examples of safety checks include fuel and battery level, cargo weight, proximity sensors (e.g. a foreign object in contact with or too close to the UAV 100), and mechanical system checks (e.g. autopilot check). A mechanical system check verifies that the motors and all movable flight surfaces are working by use of, for example, force feedback sensors to detect whether the actuators (e.g. servos) are working and that the flight surfaces are free and move in the proper range without binding. The UAV 100 may be grounded if the fuel or battery level is insufficient, if the UAV 100 and cargo are overweight, if a mechanical system is malfunctioning, an unauthorized person is too close, or an animal or other obstruction or risk factor is inside the base terminal station 1401.

In one embodiment, data may be transferred between the UAV 100 and the base terminal station 1401 through a series of micro-link radio transmitters and receivers located both within the UAV 100 and at the base terminal station 1401. Alternatively or additionally, the UAV 100 may carry a digital data logger which logs data to a non-volatile storage media (e.g. a computer memory storage device such as an SD card) analogous to the "black box" on a conventional aircraft. The data that is recorded and transferred may include details about the immediate past flight taken by the UAV 100, the unloading or loading of cargo, or the environmental conditions encountered during flight. The storage media may be removed from the UAV 100 and downloaded by a ground-based technician for analysis. For example, storage media removed from the UAV 100 can be installed into a suitable port on a ground-based computer whereby the data can be accessed and used for diagnostics and flight information. Such data may be used for general recordkeeping or for other purposes such as to optimize future versions or modules of the operating software. It may also used to make a flight log of the UAV 100 that can be shared with Civil Aviation Authorities to validate the history of the UAV 100.

Additional features of the base terminal station 1401 include a radio communication system with antenna 1404 for communication with the aircraft, a series of lights 1406 mounted along the outer edges to assist in identifying the base terminal station during night time or poor weather conditions, and a towing device (not shown) with wheels 1408 for ease of transport. The lights 1406 may be used, for example, in association with embodiments of the UAV 100 that include camera systems and image recognition software. Security and access control features may also be incorporated into the base terminal station 1401, such as numeric or alphanumeric keypads, fingerprint scanners, retinal scanners, electronic badge detectors (e.g. RFID) or the like, and the base terminal station 1401 may be surrounded by a perimeter fence. The security and/or access control features may be located just outside the base terminal station 1401 and use antennae and transmitters that relay the information to a receiver mounted within the UAV 100.

FIGS. 19A and 19B show illustrative plan views of fencing arrangements for, respectively a mobile base terminal station 1401 and a fixed base terminal station 1901. In the illustrated embodiments, the fencing 1902 is seven feet in height, topped by outwardly facing barbed wire 1904 and forms a regular octagon or "stop sign" shape having a span S of thirty-two feet. Entrance for authorized personnel is provided by way of a double gate 1906 controlled by a security keypad 1908. Cameras 1910 are disposed atop posts at the vertices of the hexagon, and warning placards 1912 are disposed at suitable intervals. The fencing arrangements shown in FIGS. 19A and 19B are merely illustrative.

FIG. 20 is a schematic block diagram of a computer system 2000 residing on the UAV 100 of FIG. 1. The computer system 2000 includes hardware and software components including electronic data modules which may cooperate in controlling, monitoring and operating the UAV 100. The UAV 100 may include memory for storing software instructions and at least one or more processors including an internal CPU 2002, which may communicate with either or both of the base terminal station 1401 or a remote controller (not shown) operated by trained personnel. The remote controller also comprises at least one processor and a memory storing software instructions. The instructions, when executed by at least one processor, can be used to direct all aspects of the operation of the UAV 100, including takeoff, landing, targeted destination, and velocity. The flight plan instructions can be communicated from the remote controller to the UAV 100 either wirelessly, or by physical transfer of a computer memory storage device such as an SD card. The software instructions executed by the processor of the remote controller can also assess whether certain parameters, such as those indicating highly unfavourable weather conditions, may impact or override instructions to proceed with a given route provided by a person operating the remote controller. Similarly, if weather conditions sensed by a CPU 2002 in the UAV 100 indicate that unfavourable conditions will be encountered along the intended route, the CPU 2002 may be configured to provide a similar override order, via said one or more instructions, or an alternate route may be proposed (for verification at the remote controller) or adopted automatically.

Additionally, data relating to sensor measurements for the cargo container 122, such as weight of cargo, may be factored into the computer-implemented dynamic decision making that incorporates the identified elements. For instance, in one aspect, the sensors located on the UAV 100 communicate the cargo weight to the remote controller, and software instructions executed by the processor of the remote controller can adjust the operating instructions for the UAV 100 accordingly, including aborting the flight if the cargo is heavier than a preprogrammed upper limit for weight. In another aspect, if the sensors located on the UAV 100 communicate to the CPU 2002 of the system 2000 that the cargo is heavier than a preprogrammed upper limit for weight, the CPU 2002 shown in FIG. 20 may override directions to proceed with a flight, or the flight parameters may be adjusted by the CPU 2002 to account for payload weight. The CPU 2002 may execute software instructions for deploying a ballistic parachute (ballistic recover system or BRS) under a certain set of predetermined conditions. If the CPU 2002 determines from sensor or other input that the UAV 100 has suffered catastrophic failure such as a mechanical or electrical failure of crucial flight control systems, the CPU 2002 can provide a signal to deploy a ballistic parachute to slow the descent of the UAV. The signal triggers ignition of an electrical fuse to deploy the ballistic parachute.

The software instructions executed by the CPU 2002 include an autopilot module 2004 and a communications module 2006. The CPU 2002 also receives input from sensors 2008 and writes to a data recorder 2010. The CPU 2002 executes the autopilot module 2004 and the communications module 2006 to manage flight of the UAV 100 from its origin to its destination. The autopilot module 2004 implements a vector control sub-module 2012 for controlling vectoring of the vectoring rotors 110 and a motor control sub-module 2014 for controlling the speed of the vectoring rotors 110 as well as the speed of the nose propeller 108 when present. The autopilot module 2004 executed by the CPU 2002 is capable of individually and independently controlling the vectoring rotors 110 carried by to the fuselage 101 in terms of angle (vectoring) and rotational speed. The autopilot module 2004 further implements a flight control sub-module for controlling flight surfaces such as the slats 104, ailerons 106 and elevators 114. The communications module 2006 receives input from a GPS receiving unit 2018 and from a Very High Frequency (VHF) Omni-Directional Range (VOR) receiving unit 2020, and executes a navigation sub-module 2022. The communications module 2006 also receives input from the AWOS, TCAS and radar systems. The architecture shown in FIG. 20 is merely illustrative, and other suitable architecture arrangements are also envisioned.

In some embodiments, the CPU 2002 may also include voice recognition software to enable the UAV 100 to recognize human speech and convert the speech into appropriate commands to the various flight controls through the autopilot module 2004. The voice recognition is preferably adapted to use established aviation phraseology from agencies such as NAV Canada and the U.S. Federal Aviation Administration (FAA). A speech recognition engine executing on a suitable remote computer system (e.g. a remote controller) receives speech input via a microphone and then executes text-to-speech conversion. The resulting text is then parsed against a set of known instructions to identify the instruction(s) signified by the speech, and the resulting instructions are transmitted via radio uplink to the CPU 2002 on the UAV 100. The CPU 2002 executes a "go/no-go" check (for example, confirming that the instructions will not jeopardize the safety of the UAV 100) and, if the "go/no-go" check is passed, the instructions are provided to the autopilot module 2004 for implementation, and a confirmation is transmitted back to the remote computer system. The confirmation may take the form of a text signal which may be converted to audio by test-to-speech conversion, or a signal which corresponds to a preprogrammed speech signal. The foregoing description is merely illustrative and not limiting, and envisages an arrangement in which processing is preferentially performed remote from the UAV 100 to minimized processing demands on the CPU 2002 so as to limit the hardware requirements on the UAV 100 and thereby limit weight. On other embodiments, additional aspects of the processing may be delegated to the CPU 2002 on the UAV 100.

Reference is now made to FIG. 21, which is a partially exploded view of an illustrative fuselage 101 for a UAV 100 according to the present disclosure, showing several access panels 2102 removed to expose certain compartments. In the illustrated embodiment, a forward compartment 2104 contains navigation hardware 2106. The navigation hardware 2106 may include, for example, a Global Navigation Satellite System (GNSS) receiver, such as those offered by NavCom Technology, Inc., having an address at 20780 Madrona Avenue, Torrance, Calif. 90503 and an automatic dependent surveillance (ADS) unit. A central compartment 2108 contains environmental awareness hardware 2110, which may include Automated Weather Observing System (AWOS) hardware, Traffic Collision Avoidance System (TCAS) hardware, Automated Dependant Surveillance Broadcast (ADS-B) hardware and radar hardware. An aft compartment 2112 contains flight control hardware 2114, including the CPU 2002. One or more of the compartments 2104, 2108 and 2112 may be shielded against radio interference. FIG. 21 also shows another alternative embodiment of a cargo container 122 in which access to the interior 2018 is provided by a hinged side door 2020.

The table below sets out certain non-limiting, illustrative specifications for one illustrative embodiment of a UAV 100 including a nose propeller 108 according to the present disclosure:

| | |
|---|---|
| Wingspan | 5.4 m (wings can be exchanged pending mission) |
| Length | 2.6 m |
| Height | 1.2 m |
| Maximum cargo load | 100 kg (clean heavy lift wing) |
| Maximum ramp weight | 220 kg |
| Maximum take-off weight | 200 kg |
| Forward power system | 300cc gas two-stroke, twin-cylinder |
| Fuel capacity | 40 litres |
| VTOL power system | 4 × 1000 watt, AC electric, out runner motors |
| Battery power | 4 × 4,000 amp hour (total 16,000 amp hour), approx. 25,000 watts |
| Maximum range | 500 km |
| Maximum endurance | 5.2 hours |
| Temperature range | −20 c./+50 c. |
| Wind gust limits | 25 km cross winds during VTOL |
| Weather limits | 60 km sustained winds (no precipitation) |
| Operational radius | 400 km |
| Cruising speed | 100 km/h |
| Maximum speed, $V_{no}$ | 140 km/h |
| Never exceed, $V_{ne}$ | 185 km/h |
| Maximum take-off length | 2 m |
| Maximum ceiling | 500 m |
| Time before major overhaul | 2000 hours |
| Fuselage materials | Combination of fibreglass and carbon fibre materials Some sections use honeycomb board (e.g. reinforcing bulkheads and high stress areas) Fuselage is predominantly a hollow structure where an aircraft aluminum structure is housed. |
| Wing materials | Aluminum sheeting and tubing along with some bar stock shapes Wing ribs are high density foam Covering (aside from solar) is plastic film. |
| Tail group materials | Aluminum sheeting and high density foam ribs with aluminum tubing |
| Cargo pod materials | Similar to fuselage |
| Ground station frequency | Licensed 900 MHz |
| Ground control | Garmin ® G1000 ® GPS ground based autopilot (can provide failover from onboard system) |
| Video downlink | 5.8 GHz |
| Autopilot | UAV Navigation model AP04 with a built in 900 MHz datalink |
| Flight controller (CPU) | 64 bit 256 MB RAM CPU (minimum) |

| | |
|---|---|
| Voice cockpit | Adacel Systems Inc. VAC using embedded Speech Recognition Service (eSRS) |
| Flight data recorder | Honeywell Connected Recorder (HCR) model HFR5-D |
| Flight recognition | Microsoft 360 model YI/Nokia 360 |

Examples of cargo include, but are not limited to, automotive parts, special documents, emergency supplies, medical supplies, UAV parts or aircraft parts, foods, mail-order items (including online or telephone orders), or anything that will fit the container and is within the weight parameters.

The disclosure therefore provides for a new configuration and features for unmanned cargo aircraft with enhanced safety features along with increased control of pitch, versatility in power sources, and increased efficiency and adaptability to various flight conditions due to its modular nature. As a winged structure outfitted with orientable propellers, it enjoys the benefits of greater carrying capacity combined with VTOL capabilities. With its further integrated sensors and computerized features, the VTOL offers significant benefits over existing unmanned aircraft. While the present disclosure has particular advantages in application to unmanned aircraft, one skilled in the art, now informed by the present disclosure, will appreciate that aspects of the disclosure are also applicable to manned aircraft operated by a human pilot physically located within the aircraft.

Certain illustrative embodiments have been described by way of non-limiting example. It will be apparent to persons skilled in the art that a number of variations and modifications can be made without departing from the scope of the claims.

What is claimed is:

1. An aircraft capable of vertical take-off and landing, comprising:
   a fuselage;
   at least one processor carried by the fuselage;
   a first pair of aerodynamic, lift-generating wings extending from the fuselage; and
   a plurality of vectoring rotors rotatably carried by the fuselage so as to be rotatable between a substantially vertical configuration relative to the fuselage and a substantially horizontal configuration relative to the fuselage and configured to be controlled by the at least one processor,
   wherein the vectoring rotors are unsupported by the first pair of wings,
   wherein the plurality of vectoring rotors comprises a forward set of vectoring rotors positioned forward of the first pair of wings and an aft set of vectoring rotors positioned aft of the first pair of wings,
   wherein, under control of the processor, the vectoring rotors transition the aircraft from vertical flight to horizontal flight by using sequential vectoring thrust wherein the entire forward set of vectoring rotors vector at a different speed and angle than the entire aft set of vectoring rotors, and
   wherein, under control of the processor, one of the entire forward set of vectoring rotors and the entire aft set of vectoring rotors provides more horizontal thrust than the other of the entire forward set of vectoring rotors and the entire aft set of vectoring rotors until the aircraft reaches a horizontal speed above a stall speed of the first pair of wings.

2. The aircraft of claim 1, wherein:
   the vectoring rotors are carried by rotor shafts carried by the fuselage;
   the vectoring rotors are in a first position during vertical flight and in a second position during horizontal flight; and wherein the vectoring rotors transition from the first position to the second position by rotating the rotor shafts along a rotational axis upon receipt of a flight control signal from the central processing unit.

3. The aircraft of claim 2, wherein rotation of the rotor shafts by 90 degrees transitions the vectoring rotors between the first position and the second position.

4. The aircraft of claim 2, wherein rotation of the rotor shafts by less than 90 degrees causes the vectoring rotors to take on an intermediate position between the first position and the second position.

5. The aircraft of claim 1, wherein each of the vectoring rotors is controllable independently of each other to provide lateral and yaw stability during low speed maneuvering.

6. The aircraft of claim 1, wherein the plurality of vectoring rotors are configured around the center of gravity of the aircraft.

7. The aircraft of claim 1, wherein the aircraft is an unmanned aircraft.

8. The aircraft of claim 1, further comprising a nose propeller.

9. The aircraft of claim 1, wherein the first pair of wings are modular and removably connected to the fuselage and configured to be interchangeable with an alternate pair of wings and the vectoring rotors are unsupported by the alternate pair of wings.

10. The aircraft of claim 9, wherein the first pair of wings and the alternate pair of wings have different aerodynamic configurations and wherein when the alternate pair of wings are installed, the processor controls transition of the aircraft from vertical flight to horizontal flight by using sequential vectoring thrust wherein one of the forward set of vectoring rotors and the aft set of vectoring rotors provide more horizontal thrust than the other of the forward set of vectoring rotors and the aft set of the vectoring rotors until the aircraft reaches a horizontal speed above a stall speed of the alternate pair of wings.

11. The aircraft of claim 1, further comprising at least one first tail fin secured at a rear of the fuselage.

12. The aircraft of claim 11, wherein the at least one first tail fin is modular and interchangeable with at least one alternate tail fin.

13. The aircraft of claim 11, wherein the at least one alternate tail fin is configured to be secured to the fuselage at the same position as the at least one first tail fin.

14. The aircraft of claim 11, wherein the at least one first tail fin and the at least one alternate tail fin have different aerodynamic configurations.

15. The aircraft of claim 1, further comprising a first cargo container secured to an underside of the fuselage.

16. The aircraft of claim 15, wherein the first cargo container is modular and interchangeable with an alternate cargo container.

17. The aircraft of claim 16, wherein the alternate cargo container is configured to be secured to the fuselage at the same position as the first cargo container.

18. The aircraft of claim 16, wherein the first cargo container and the alternate cargo container have different designs.

19. The aircraft of claim 15, wherein the first cargo container is outfitted with at least one proximity sensor and the first cargo container is adapted to use data from the at least one proximity sensor to authenticate identity of approaching personnel and, responsive to detecting the presence of an unauthorized person, to cause the cargo container to be locked down and its contents rendered inaccessible.

20. The aircraft of claim 15, wherein the first cargo container is outfitted with at least one weight sensor to determine a weight of cargo in the first cargo container and the first cargo container is coupled to circuitry of the aircraft, so that data received from the at least one weight sensor is factored into instructions sent to the aircraft via the processor or from a remote controller.

21. An unmanned aerial vehicle (UAV) system, comprising:
   an aircraft capable of vertical take-off and landing, the aircraft comprising:
      a fuselage;
      at least one processor carried by the fuselage;
      a first cargo container secured to an underside of the fuselage;
      a first pair of aerodynamic, lift-generating wings extending from the fuselage;
      a plurality of vectoring rotors rotatably carried by the fuselage so as to be rotatable between a substantially vertical configuration relative to the fuselage and a substantially horizontal configuration relative to the fuselage and configured to be controlled by the at least one processor;
      wherein the vectoring rotors are unsupported by the first pair of wings;
      wherein the plurality of vectoring rotors comprises a forward set of vectoring rotors positioned forward of the first pair of wings and an aft set of vectoring rotors positioned aft of the first pair of wings;
      wherein, under control of the processor, the vectoring rotors transition the aircraft from vertical flight to horizontal flight by using sequential vectoring thrust wherein the entire forward set of vectoring rotors vector at a different speed and angle than the entire aft set of vectoring rotors;
      wherein, under control of the processor, one of the entire forward set of vectoring rotors and the entire aft set of vectoring rotors provides more horizontal thrust than the other of the entire forward set of vectoring rotors and the entire aft set of vectoring rotors until the aircraft reaches a horizontal speed above a stall speed of the first pair of wings;
   wherein the aircraft is unmanned; and
   at least one base terminal station, wherein each base terminal station:
      has a surface area that serves as a landing pad for the aircraft;
      has a GPS locator for the aircraft to track to a location of the base terminal station during landing; and
      is adapted to automatically replenish an energy supply of the aircraft.

22. The UAV system of claim 21, wherein each base terminal station is adapted to recharge a battery of the aircraft after landing.

23. The UAV system of claim 21, wherein each base terminal station is adapted to deliver a supply of liquid fuel to a liquid fuel tank of the aircraft after landing.

24. The UAV system of claim 21, wherein each base terminal station includes one or more processors and a memory having software instructions thereon which, when executed, retrieves data from the aircraft after landing and processes the data to confirm that the aircraft is safe to operate.

25. A method of operating an aircraft capable of vertical take-off and landing, the method comprising:
   providing an aircraft, the aircraft comprising:
      a fuselage;
      at least one processor carried by the fuselage;
      a first pair of aerodynamic, lift-generating wings extending from the fuselage;
      a plurality of vectoring rotors rotatably carried by the fuselage so as to be rotatable between a substantially vertical configuration relative to the fuselage and a substantially horizontal configuration relative to the fuselage and configured to be controlled by the at least one processor,
      wherein the plurality of vectoring rotors comprises a forward set of vectoring rotors positioned forward of the wings and an aft set of vectoring rotors positioned aft of the wings, and
      wherein the vectoring rotors are unsupported by the first pair of wings; and
   transitioning the aircraft from vertical flight to horizontal flight by using sequential vectoring thrust wherein the entire forward set of vectoring rotors vector at a different speed and angle than the entire aft set of vectoring rotors,
   wherein one of the entire forward set of vectoring rotors and the entire aft set of vectoring rotors provide more horizontal thrust than the other of the entire forward set of vectoring rotors and the entire aft set of the vectoring rotors until the aircraft reaches a horizontal speed above a stall speed of the wings.

26. The method of claim 25, further comprising transporting a first cargo container secured to an underside of the fuselage.

27. The method of claim 25, further comprising:
   the aircraft vertically landing at a base terminal station;
   from the base terminal station, automatically replenishing an energy supply of the aircraft; and
   the aircraft vertically taking off from the base terminal station.

28. The method of claim 27, further comprising:
   while landed at the base terminal station, and before taking off from the base terminal station, retrieving data from the aircraft and processing the data to confirm that the aircraft is safe to operate.

29. The method of claim 26, wherein the first cargo container is modular and interchangeable with an alternate cargo container, the method further comprising removing the first cargo container from the fuselage and securing the alternate cargo container to the fuselage at the same position as the first cargo container.

30. The method of claim 25, wherein the first pair of wings are modular and removably connected to the fuselage, the method further comprising removing the first pair of wings and replacing the first pair of wings with an alternate pair of wings, wherein the first pair of wings and the alternate pair of wings have different aerodynamic configurations.

31. The method of claim 25, wherein the aircraft further comprises at least one first tail fin secured at a rear of the fuselage, wherein the at least one first tail fin is modular and removable, the method further comprising removing the first tail fin and replacing the first tail fin with at least one alternate tail fin, wherein the at least one first tail fin and the at least one alternate tail fin have different aerodynamic configurations.

* * * * *